United States Patent
Tsuiki et al.

(10) Patent No.: US 10,693,337 B2
(45) Date of Patent: Jun. 23, 2020

(54) METHOD FOR MANUFACTURING ARMATURE

(71) Applicant: Mitsubishi Electric Corporation, Chiyoda-ku, Tokyo (JP)

(72) Inventors: Hironori Tsuiki, Tokyo (JP); Akira Hashimoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 251 days.

(21) Appl. No.: 15/576,512

(22) PCT Filed: Aug. 24, 2016

(86) PCT No.: PCT/JP2016/074614
§ 371 (c)(1),
(2) Date: Nov. 22, 2017

(87) PCT Pub. No.: WO2017/038570
PCT Pub. Date: Mar. 9, 2017

(65) Prior Publication Data
US 2018/0145553 A1    May 24, 2018

(30) Foreign Application Priority Data
Aug. 28, 2015 (JP) .................. 2015-168984

(51) Int. Cl.
*H02K 15/00* (2006.01)
*H02K 15/14* (2006.01)
(Continued)

(52) U.S. Cl.
CPC ............... *H02K 3/345* (2013.01); *H02K 3/04* (2013.01); *H02K 3/12* (2013.01); *H02K 15/06* (2013.01); *H02K 15/10* (2013.01)

(58) Field of Classification Search
CPC ........... H02K 3/04; H02K 3/345; H02K 3/12; H02K 15/06; H02K 15/10
See application file for complete search history.

(56) References Cited

U.S. PATENT DOCUMENTS 8,936,211 B2 * 1/2015 Yamaguchi ............. H01F 41/06
242/432.5
9,712,012 B2 * 7/2017 Yokota ..................... H02K 3/12
(Continued)

FOREIGN PATENT DOCUMENTS

JP    54-097702 A    8/1979
JP    59-059037 A    4/1984
(Continued)

OTHER PUBLICATIONS

International Search Report (PCT/ISA/210) dated Dec. 6, 2016, by the Japanese Patent Office as the International Searching Authority for International Application No. PCT/JP2016/074614.
(Continued)

*Primary Examiner* — Paul D Kim
(74) *Attorney, Agent, or Firm* — Buchanan Ingersoll & Rooney PC

(57) ABSTRACT

An annular conductor retaining device has a retention guide portion formed by blades arranged in a cylindrical shape with gaps therebetween. An annular conductor is inserted into two of the gaps across a plurality of the blades. The next annular conductor is inserted into the gaps to partially overlap the previously arranged annular conductor. This step is repeated so that the annular conductors are arranged in a spiral shape in the retention guide portion. The retention guide portion and the inner circumferential part of the core are fitted to each other, and the gaps and the slots of the core are made to coincide with each other. A pusher is inserted into the inner circumferential part of the retention guide portion so that the annular conductors are caught on the
(Continued)

pusher, to move them in the axial direction into the slots of the core, and thus become the coils.

9 Claims, 36 Drawing Sheets

(51) Int. Cl.
*H02K 15/16* (2006.01)
*H02K 3/34* (2006.01)
*H02K 15/06* (2006.01)
*H02K 3/12* (2006.01)
*H02K 15/10* (2006.01)
*H02K 3/04* (2006.01)

(56) References Cited

U.S. PATENT DOCUMENTS

| 10,170,950 | B2* | 1/2019 | Sakaue | H02K 3/28 |
| 2008/0012433 | A1 | 1/2008 | Yamaguchi et al. | |
| 2012/0025658 | A1* | 2/2012 | Watanabe | H02K 3/12 310/179 |
| 2014/0215806 | A1* | 8/2014 | Yamaguchi | H02K 15/068 29/596 |

FOREIGN PATENT DOCUMENTS

| JP | 2007-336720 A | 12/2007 |
| JP | 2010-028940 A | 2/2010 |
| JP | 2012-239323 A | 12/2012 |
| JP | 2013-123339 A | 6/2013 |
| JP | 2014-192971 A | 10/2014 |
| JP | 2015-220777 A | 12/2015 |

OTHER PUBLICATIONS

Written Opinion (PCT/ISA/237) dated Dec. 6, 2016, by the Japanese Patent Office as the International Searching Authority for International Application No. PCT/JP2016/074614.

* cited by examiner

METHOD FOR MANUFACTURING ARMATURE

TECHNICAL FIELD

The present invention relates to a method for manufacturing an armature, and an armature.

BACKGROUND ART

In recent years, rotary electric machines such as an electric motor and an electric generator are required to have a small size, high output, and high quality. Therefore, an armature using an armature winding having a distributed winding structure, which can suppress torque pulsation and enables increase in output, is required. Further, because of rising of the magnet price, demand for rotary electric machines not using magnets also increases, and an armature using an armature winding of a distributed winding type and having a higher efficiency is required. It is noted that a winding of a concentrated winding type is configured by winding a conductive wire around one tooth, whereas an armature winding of a distributed winding type is configured by winding a conductive wire in slots separated from each other by two or more slots. That is, winding is made such that a conductive wire leading out from one slot is inserted into another slot across two or more consecutive teeth.

In a conventional method for manufacturing an armature having an armature winding of a distributed winding type, the armature is mass-produced using a device called an inserter for inserting a coil. The armature manufactured by this method has a structure called concentric winding in which coil ends are arranged concentrically. In this structure, interference between the coil ends increases, leading to increase in the size of the armature. On the other hand, in lap winding which is one type of distributed winding and in which the coil ends are arranged in a volute shape, the coil ends less interfere with each other. Therefore, the coil ends can be made smaller than those in the case of concentric winding, and size reduction can be achieved. However, because of the configuration, it is impossible to perform assembling from one direction, and therefore it is difficult to achieve automation. Accordingly, a coil retaining device as an annular conductor retaining device is proposed in which, when annular conductors to be coils are retained in a lap winding shape in the coil retaining device, a plurality of annular conductors are retained by each of two main retaining portions which are movable and have semi-cylindrical shapes (which can be a cylindrical shape when integrated), the main retaining portions are moved to be integrated into a cylindrical shape so that the annular conductors retained by the respective main retaining portions overlap each other, and then the annular conductors are inserted into slots of a core (see, for example, Patent Document 1).

In a coil arrangement method in another conventional method for manufacturing an armature, in an arrangement step S, a plurality of annular conductors are arranged so as to overlap each other in an inclined state in a coil retainer having a plurality of blades arranged in a cylindrical shape. This arrangement step includes a normal arrangement step and a special arrangement step. In the normal arrangement step, normal annular conductors are sequentially inserted in accordance with an arrangement order defined by a normal arrangement direction as long as insertion operation is possible. The normal arrangement step is finished when the next insertion operation is impossible. Then, the rest of the annular conductors (annular conductors that cannot be inserted in the same manner as the other normal annular conductors) are provided as specific annular conductors in the subsequent special arrangement step. In the special arrangement step, each of the plurality of specific annular conductors is inserted being inclined in the opposite direction with respect to the normal annular conductors arranged in the normal arrangement step (see, for example, Patent Document 2).

CITATION LIST

Patent Document

Patent Document 1: Japanese Laid-Open Patent Publication No. 2013-123339
Patent Document 2: Japanese Laid-Open Patent Publication No. 2014-192971

SUMMARY OF THE INVENTION

Problems to be Solved by the Invention

The conventional methods for manufacturing an armature have the following problems. The coil retaining device as an annular conductor retaining device described in Patent Document 1 is configured as described above, so that it is necessary to perform operation in which the annular conductors are divided into two sets and retained by the two main retaining portions having semi-cylindrical shapes and then the main retaining portions are moved to be integrated into a cylindrical shape. Thus, the configuration of the coil retaining device is complicated, whereby equipment cost increases and takt time for inserting coils (annular conductors) increases, resulting in reduction in production efficiency. In the manufacturing method described in Patent Document 2, a plurality of annular conductors are arranged in the coil retainer which has a plurality of blades arranged in a cylindrical shape and which does not need integration into a cylindrical shape, and then the annular conductors can be inserted into slots by a coil extruder. However, as annular conductors, the normal annular conductors and the specific annular conductors need to be used, and in the specific step, the plurality of specific annular conductors need to be inserted being inclined in the opposite direction with respect to the normal annular conductors arranged in the normal step. Thus, the manufacturing process is complicated and production efficiency is reduced.

The present invention has been made to solve the above problems, and an object of the present invention is to provide an armature manufacturing method that enables improvement in production efficiency by using a simple annular conductor retaining device, and obtain an armature with excellent productivity.

Solution to the Problems

A method for manufacturing an armature according to the present invention is a method for manufacturing an armature including a core having a plurality of slots provided at a cylindrical inner circumferential part, and coils inserted into the slots. The method is performed by using an annular conductor inserting device. The annular conductor inserting device includes: a retention guide portion having support members and a fixation member, the support members being arranged in a cylindrical shape with gaps therebetween in a circumferential direction and one end of each support member being fixed to the fixation member, thus forming a cylindrical part, the cylindrical part being able to be fitted to the inner circumferential part of the core and configured such that positions in the circumferential direction of the gaps coincide with positions of the slots of the core; and an engagement portion configured to be movable, inside the cylindrical part, in an axial direction of the cylindrical part. The method includes the following steps:

an arrangement step of arranging a necessary number of annular conductors each formed by winding a conductive wire in an annular shape, in the retention guide portion, by combination of: a simple arrangement step of inserting, across a plurality of the support members, a plurality of the annular conductors into the gaps in which the annular conductors have not been inserted yet, thereby arranging the plurality of annular conductors in the retention guide portion; and an overlap arrangement step of inserting another of the annular conductors into others of the gaps across a plurality of the support members so as to partially overlap the previously inserted annular conductor in the axial direction, thereby arranging the other annular conductor in the retention guide portion;

a fitting step of fitting the retention guide portion and the inner circumferential part of the core to each other and causing the positions in the circumferential direction of the gaps to coincide with the positions of the slots; and an insertion step of moving the engagement portion in the axial direction of the retention guide portion and engaging the engagement portion with the annular conductors arranged in the retention guide portion, to insert the annular conductors into the slots, thereby forming the coils.

An armature according to the present invention includes: a core having a plurality of slots provided at a cylindrical inner circumferential part; coils inserted into the slots; and insulating members. Each coil has slot accommodation portions accommodated in the corresponding slots, and coil ends connecting the slot accommodation portions. Each insulating member has insulating portions and linkage portions, the insulating portions each covering one side, of the corresponding coil end, in a radial direction of the inner circumferential part of the core, the linkage portions being inside the slots and connecting the insulating portions.

Effect of the Invention

The method for manufacturing an armature according to the present invention includes the arrangement step of arranging a necessary number of annular conductors by combination of the simple arrangement step and the overlap arrangement step. In the simple arrangement step, a plurality of annular conductors formed by winding a conductive wire in an annular shape are inserted, across a plurality of the support members, in the gaps in which the annular conductors have not been inserted yet, and thus arranged in the retention guide portion. The gaps are the gaps of the annular conductor inserting device including the retention guide portion having the cylindrical part formed by the support members which are arranged in a cylindrical shape with the gaps therebetween in the circumferential direction, and one end of each support member is fixed to the fixation member. In the overlap arrangement step, another of the annular conductors is inserted into others of the gaps across a plurality of the support members so as to partially overlap the previously inserted annular conductor in the axial direction of the cylindrical part, and thus arranged in the retention guide portion. Therefore, production efficiency can be improved with a simple annular conductor retaining device.

The armature according to the present invention includes: the core having the plurality of slots provided at the cylindrical inner circumferential part; the coils inserted into the slots; and the insulating members. Each insulating member has the insulating portions and the linkage portions. Each insulating portion covers one side, of the corresponding coil end, in the radial direction of the inner circumferential part of the core. The linkage portions are located inside the slots and connecting the insulating portions. Therefore, production efficiency can be improved.

DESCRIPTION OF EMBODIMENTS

Embodiment 1

Figure 1:
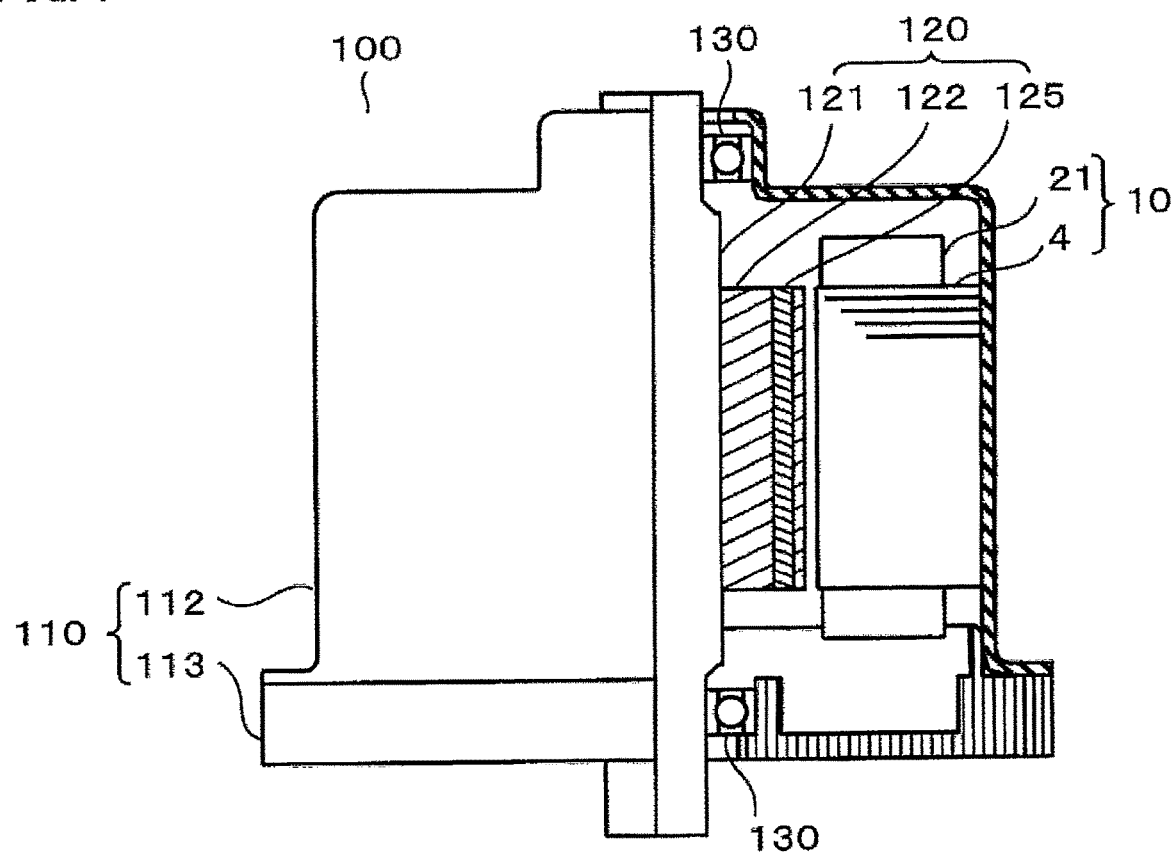
FIG. 1 is a partial sectional view of a rotary electric machine according to embodiment 1 of the present invention.
Figure 2:
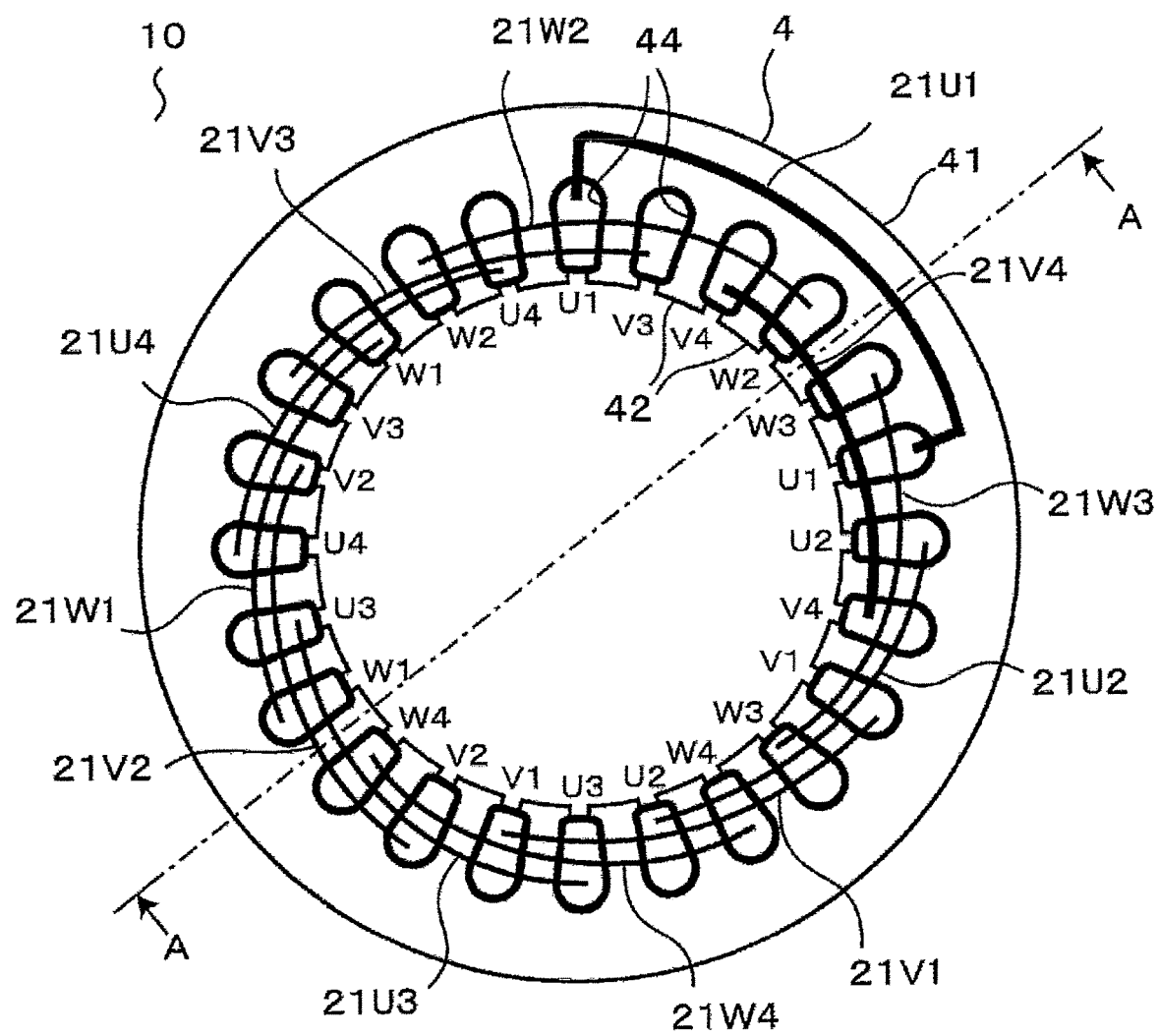
FIG. 2 is a plan view of the armature in FIG. 1.
Figure 3:
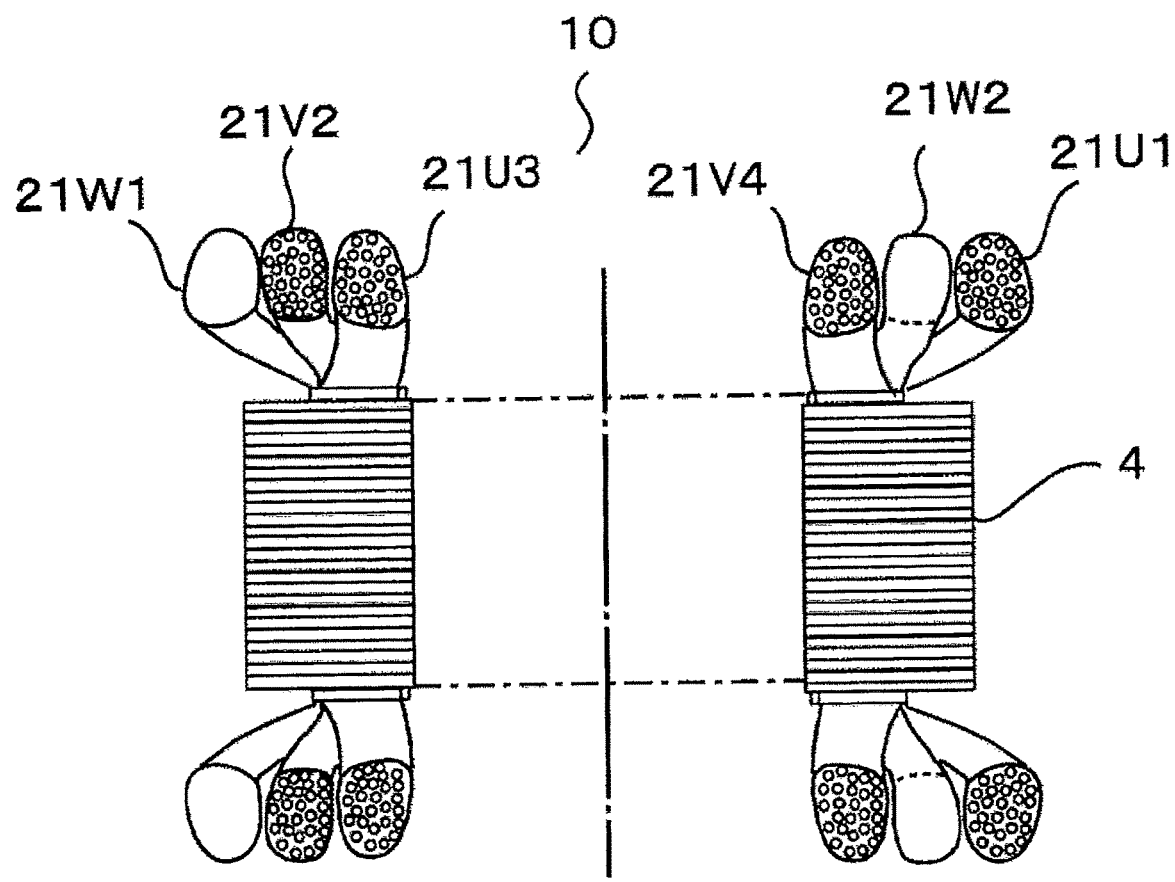
FIG. 3 is an axial-direction sectional view of the armature in FIG. 1.
Figure 4:
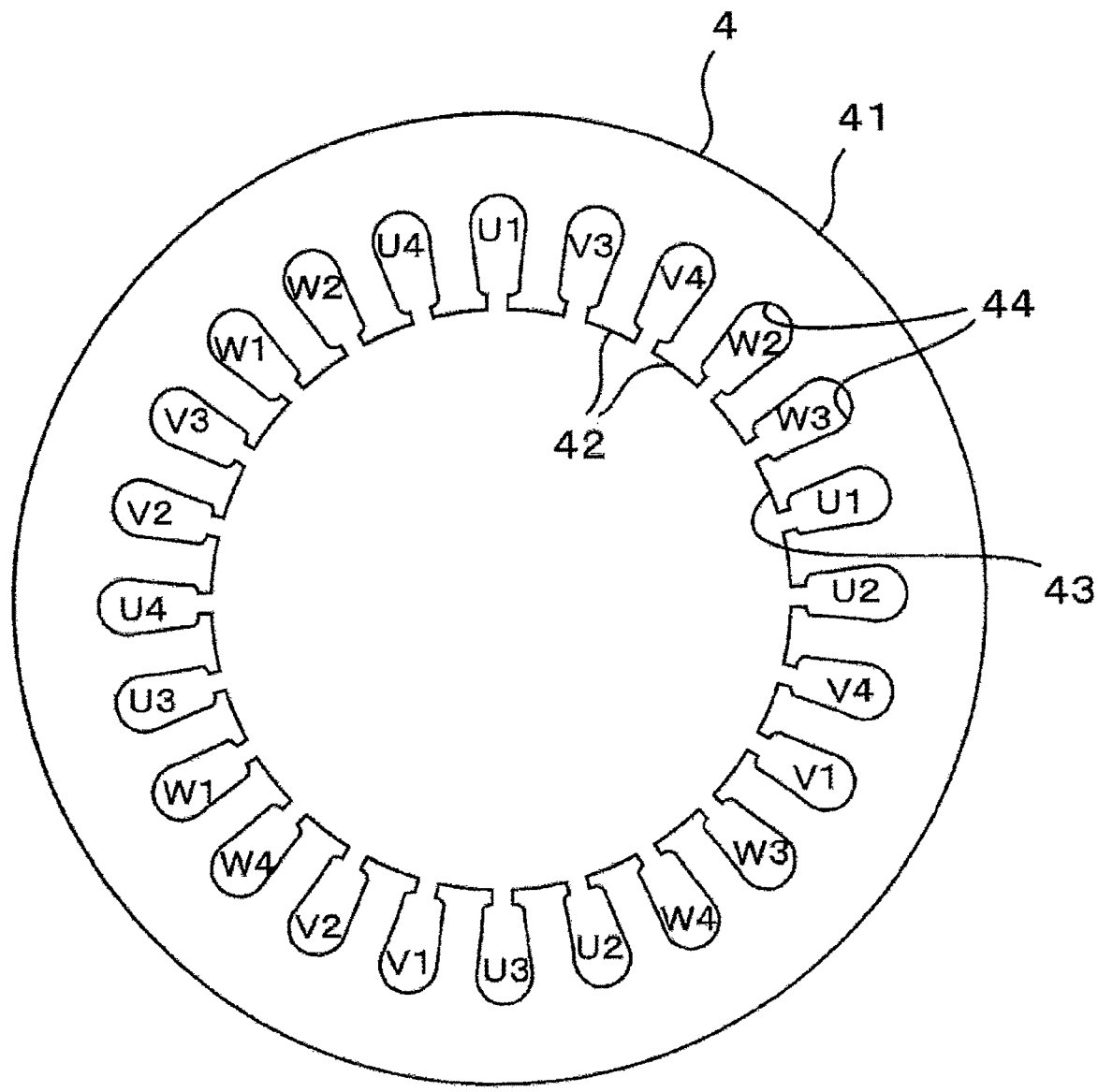
FIG. 4 is a plan view of a core of the armature in FIG. 2.
Figure 5:
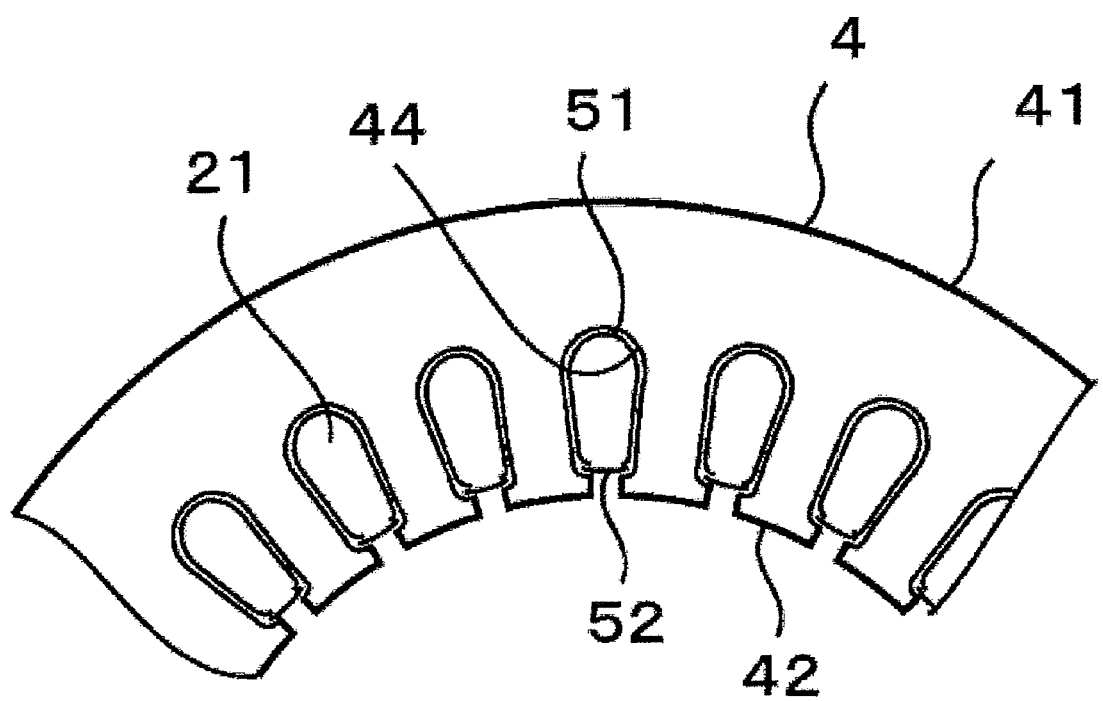
FIG. 5 is a major part plan view of the core of the armature in FIG. 2.
Figure 6:
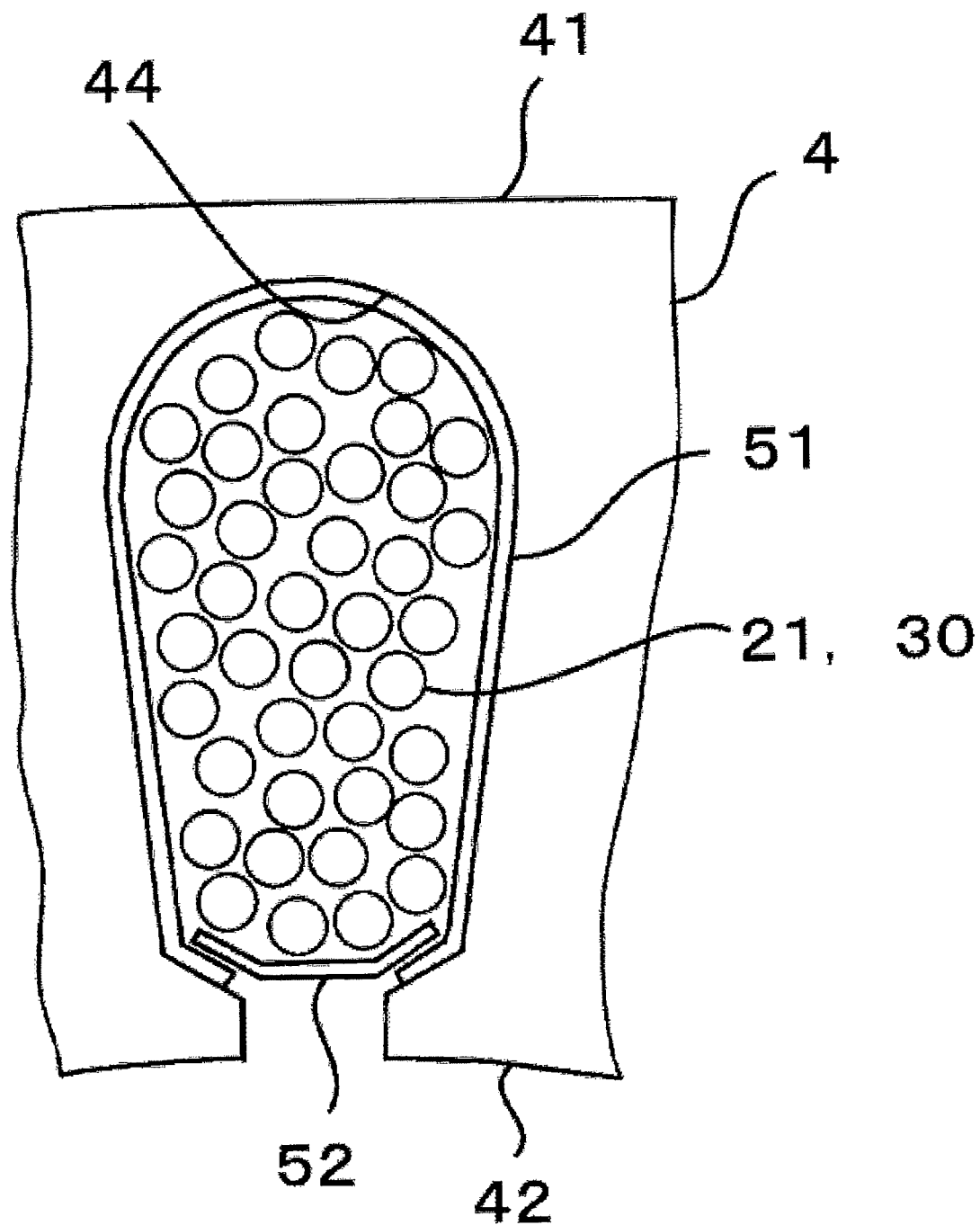
FIG. 6 is a detailed sectional view of a slot portion of the armature in FIG. 2.
Figure 7:
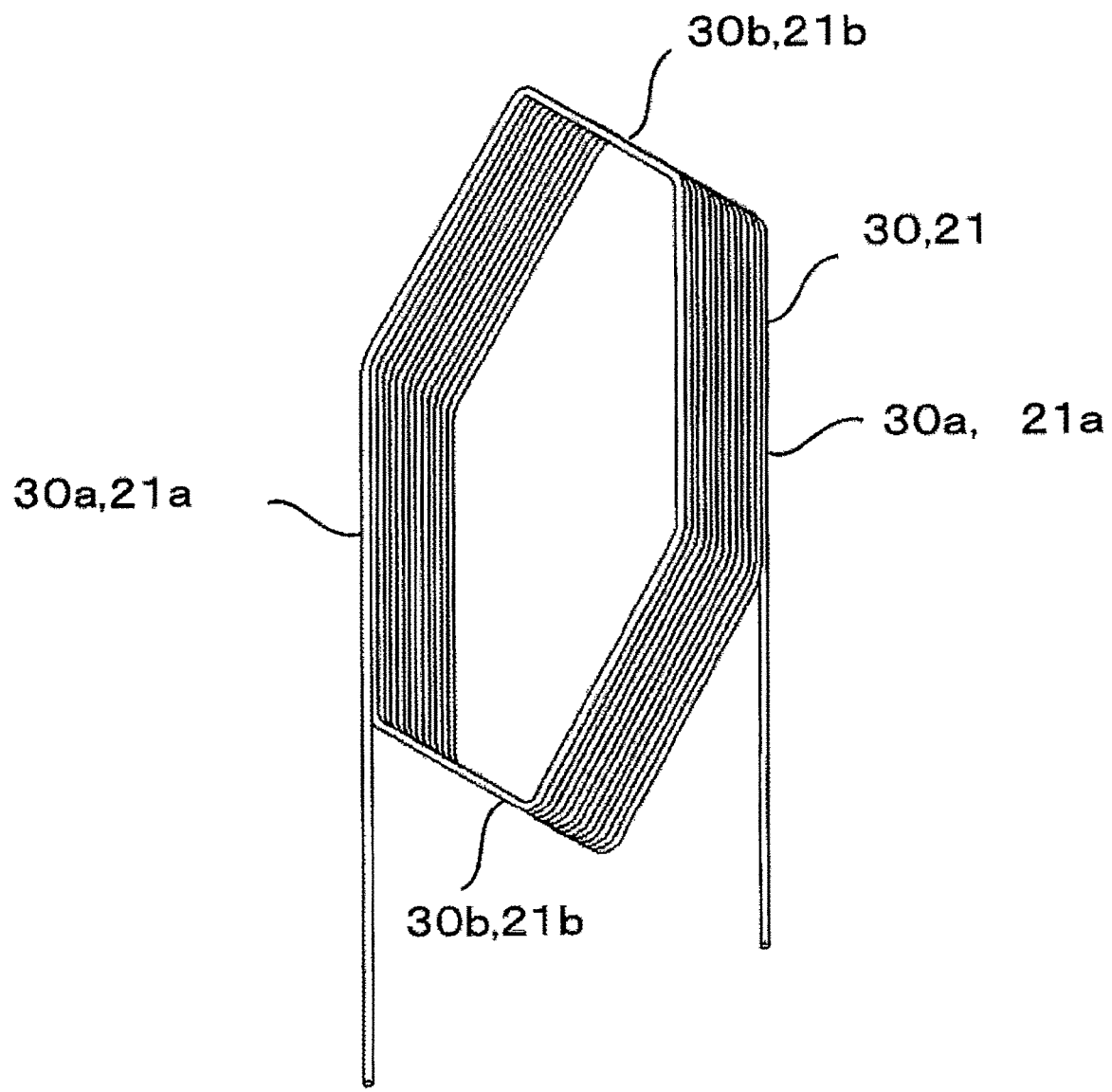
FIG. 7 is a perspective view showing the correspondence relationship between an annular conductor to be inserted into slots of the core in FIG. 4, and a coil obtained by the annular conductor being inserted into the slots.
Figure 8:
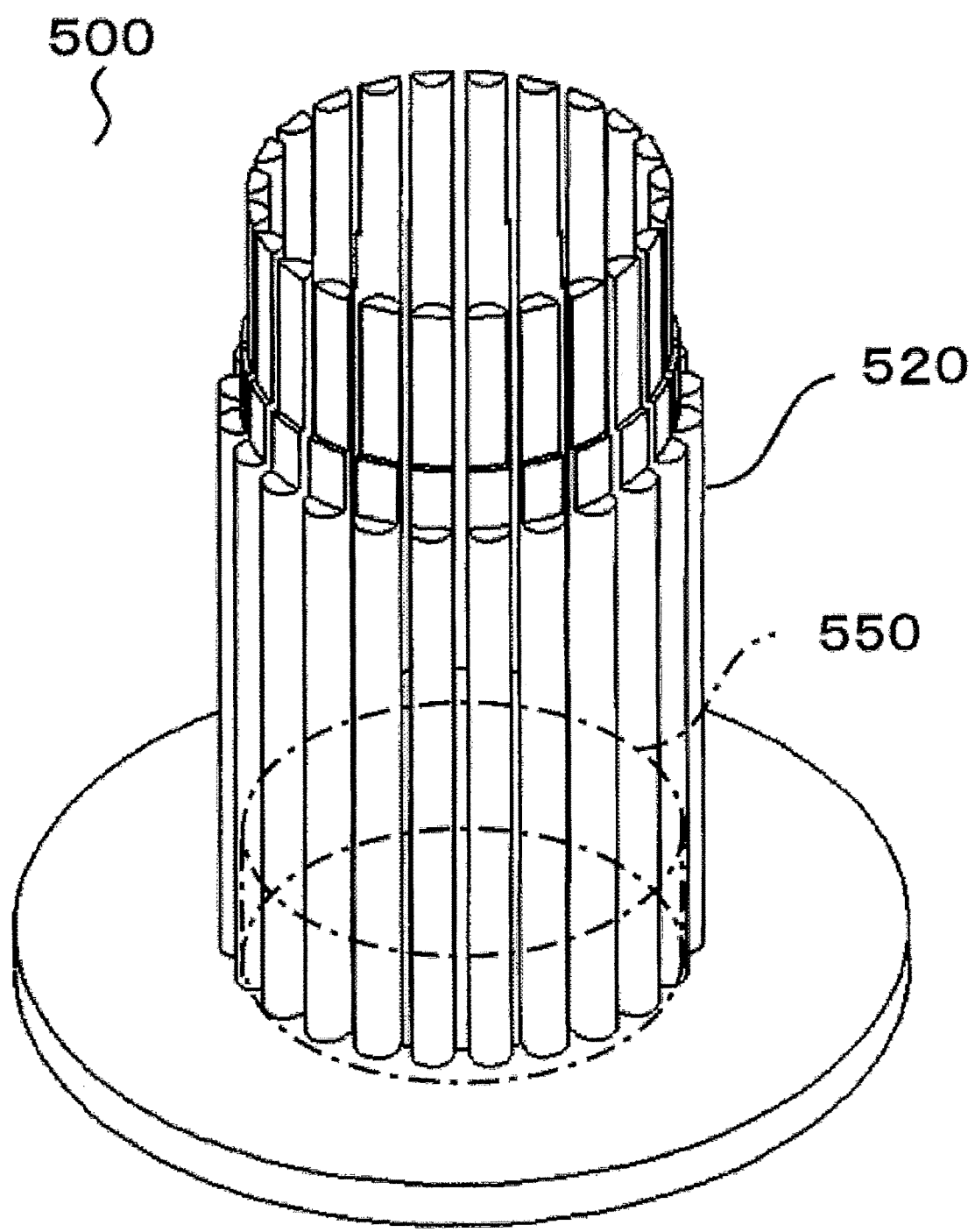
FIG. 8 is a perspective view of an annular conductor inserting device used for manufacturing the armature in FIG. 2.
Figure 9:
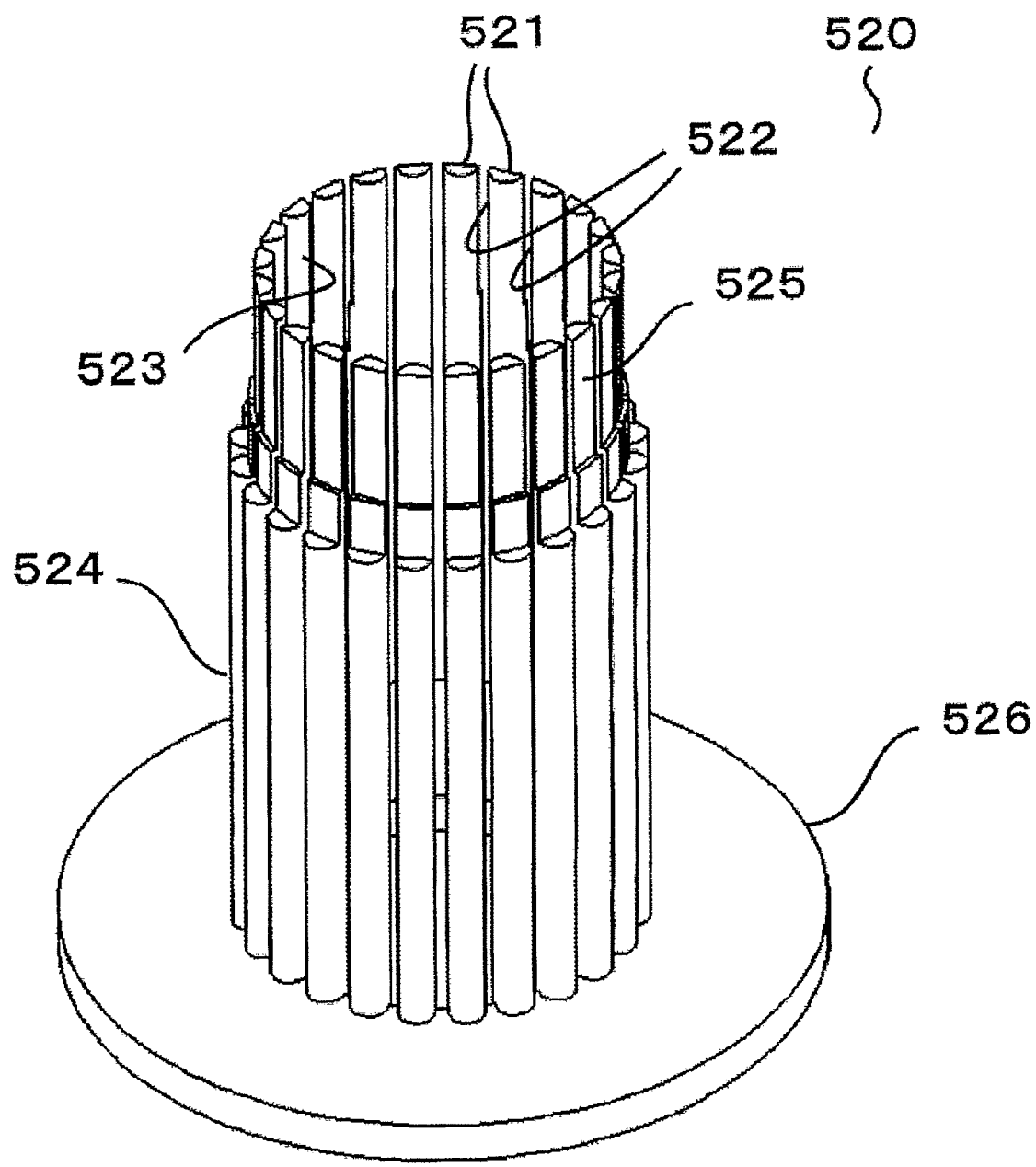
FIG. 9 is a perspective view of a retention guide portion in FIG. 8.
Figure 10:
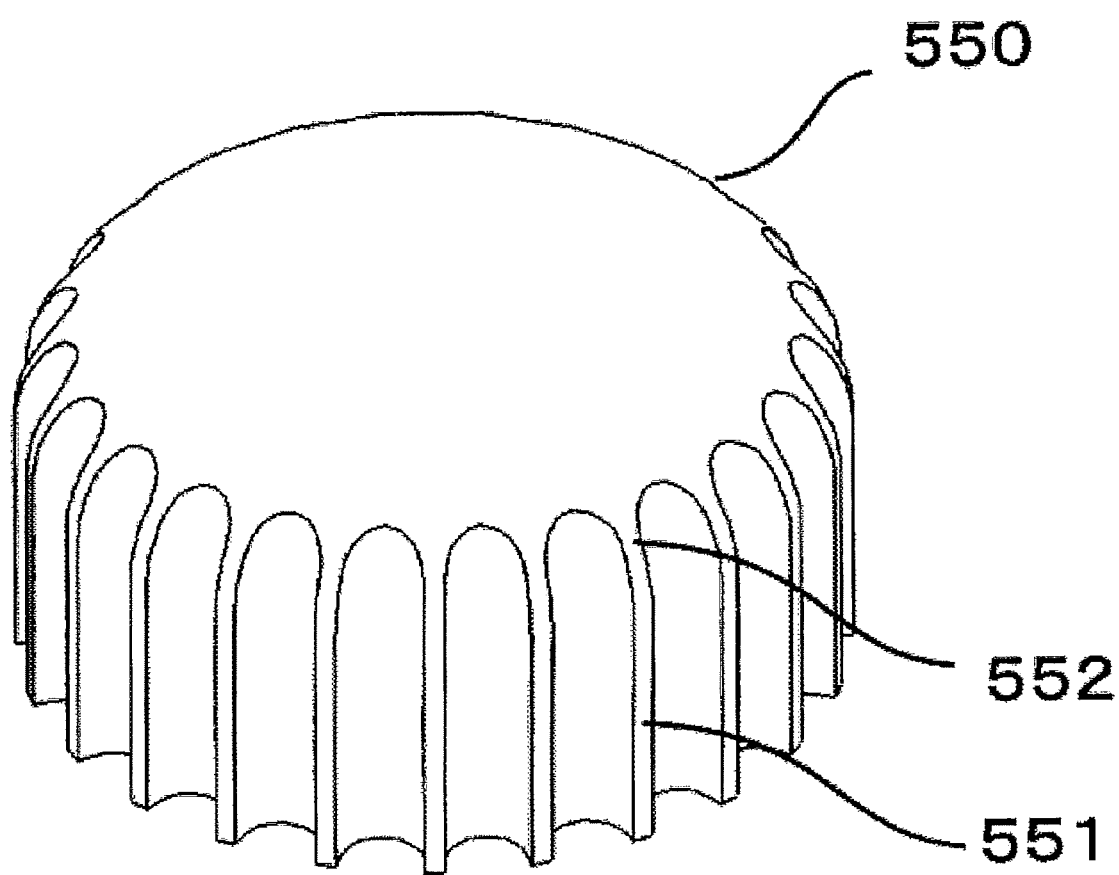
FIG. 10 is a perspective view of a pusher in FIG. 8.
Figure 11:
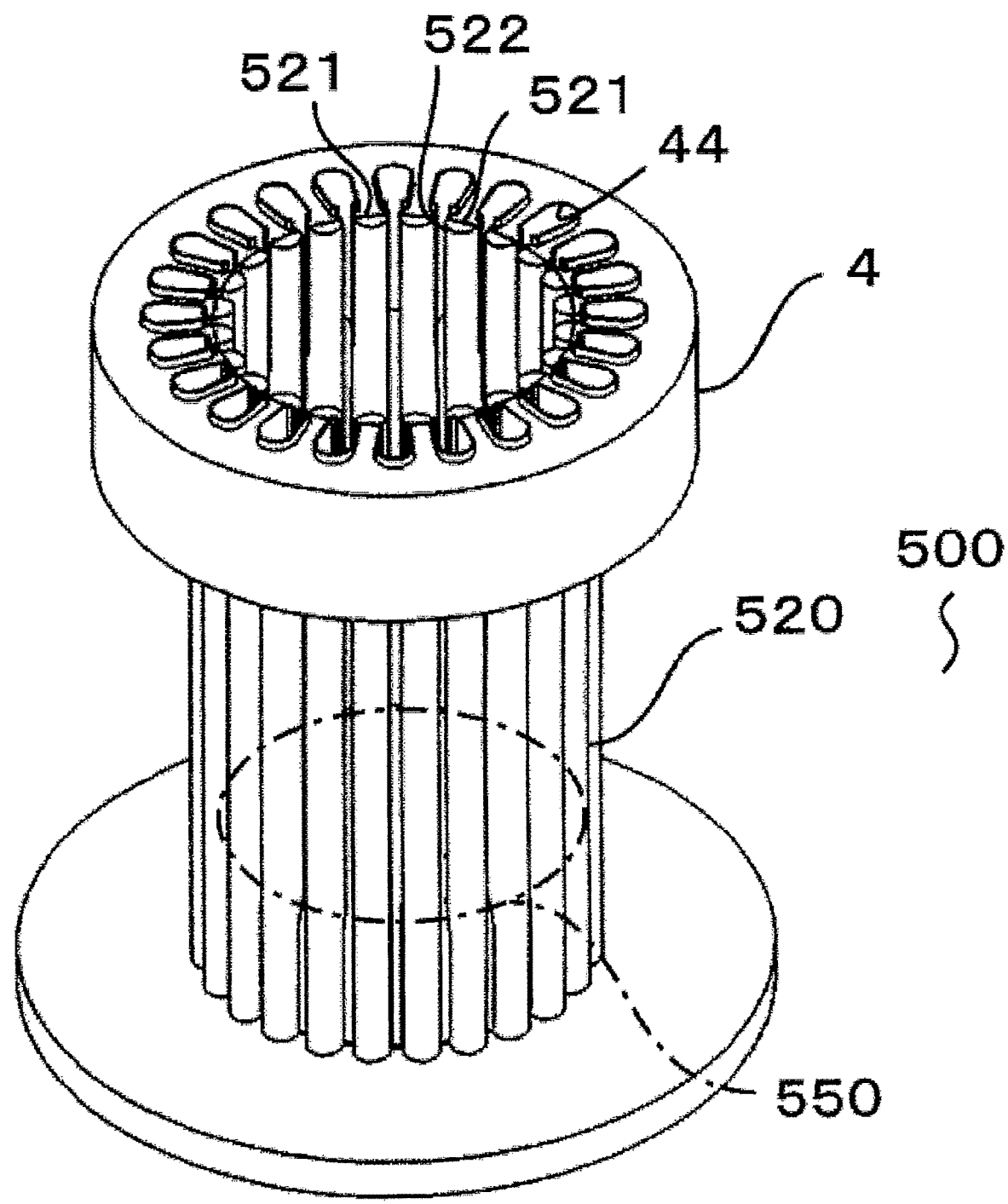
FIG. 11 is a perspective view of the annular conductor inserting device in FIG. 8 and the core combined with each other.
Figure 12:
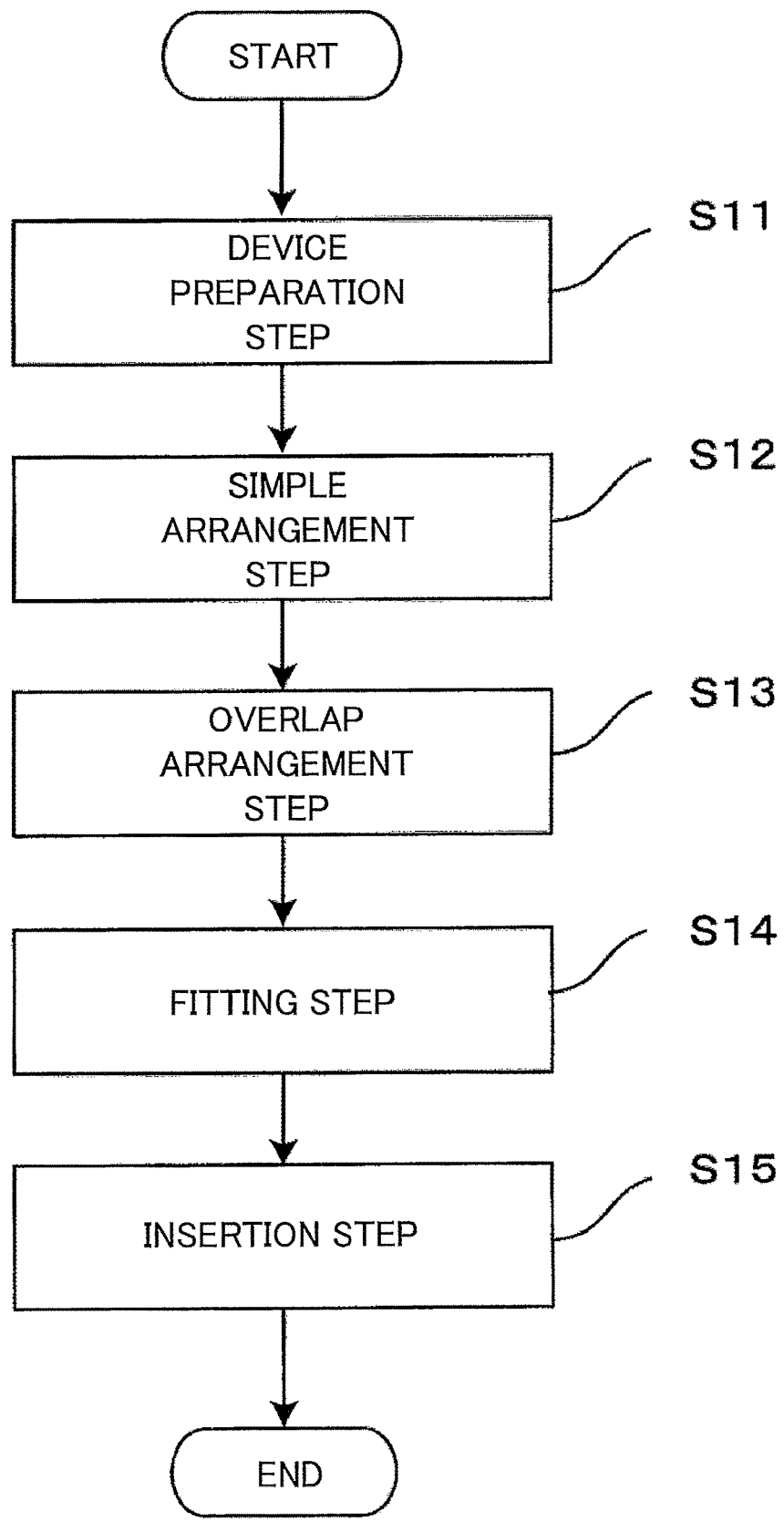
FIG. 12 is a flowchart illustrating a process for manufacturing the armature.
Figure 13:
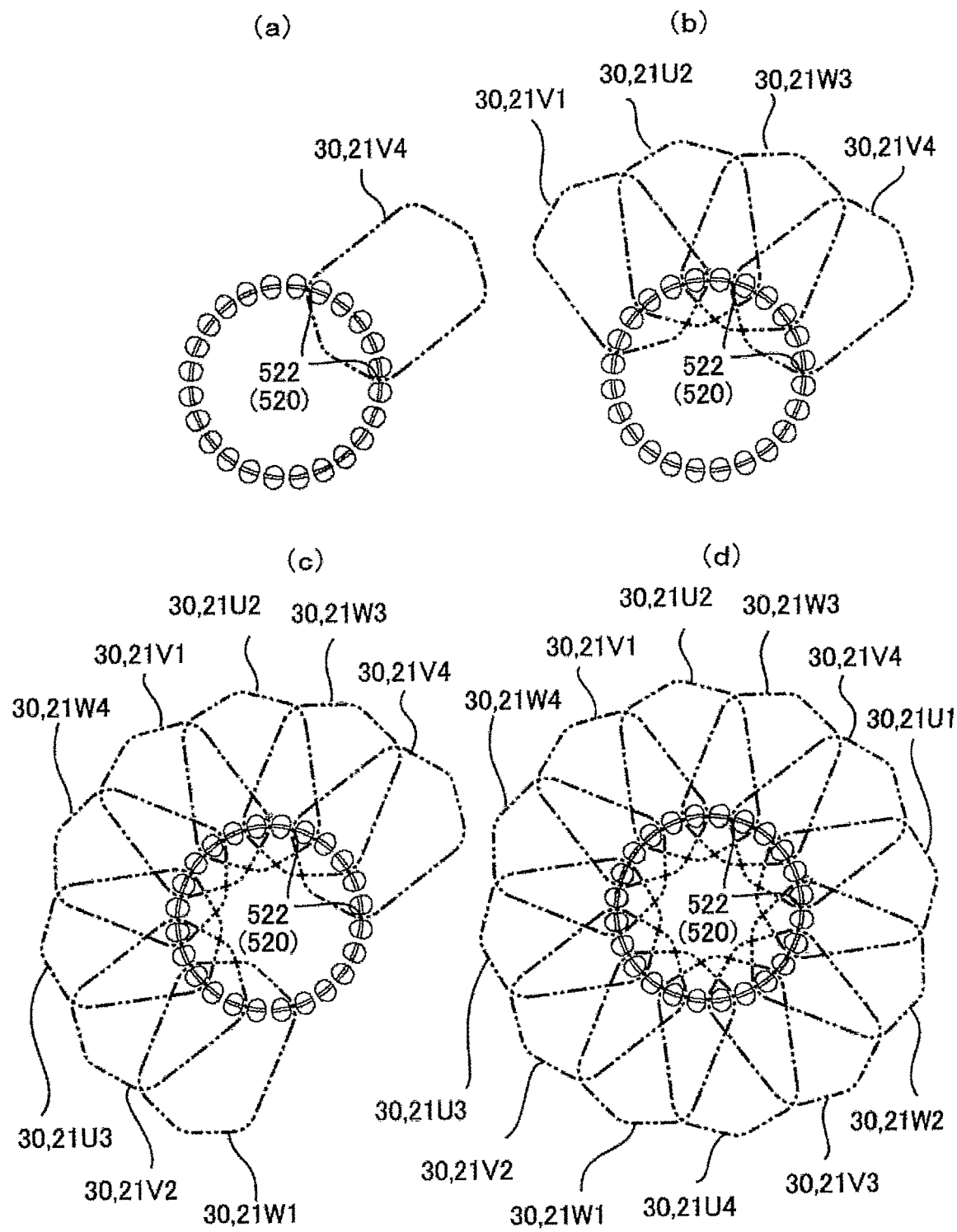
FIG. 13 illustrates an order in which the annular conductors are arranged in the annular conductor inserting device in FIG. 8.
Figure 14:
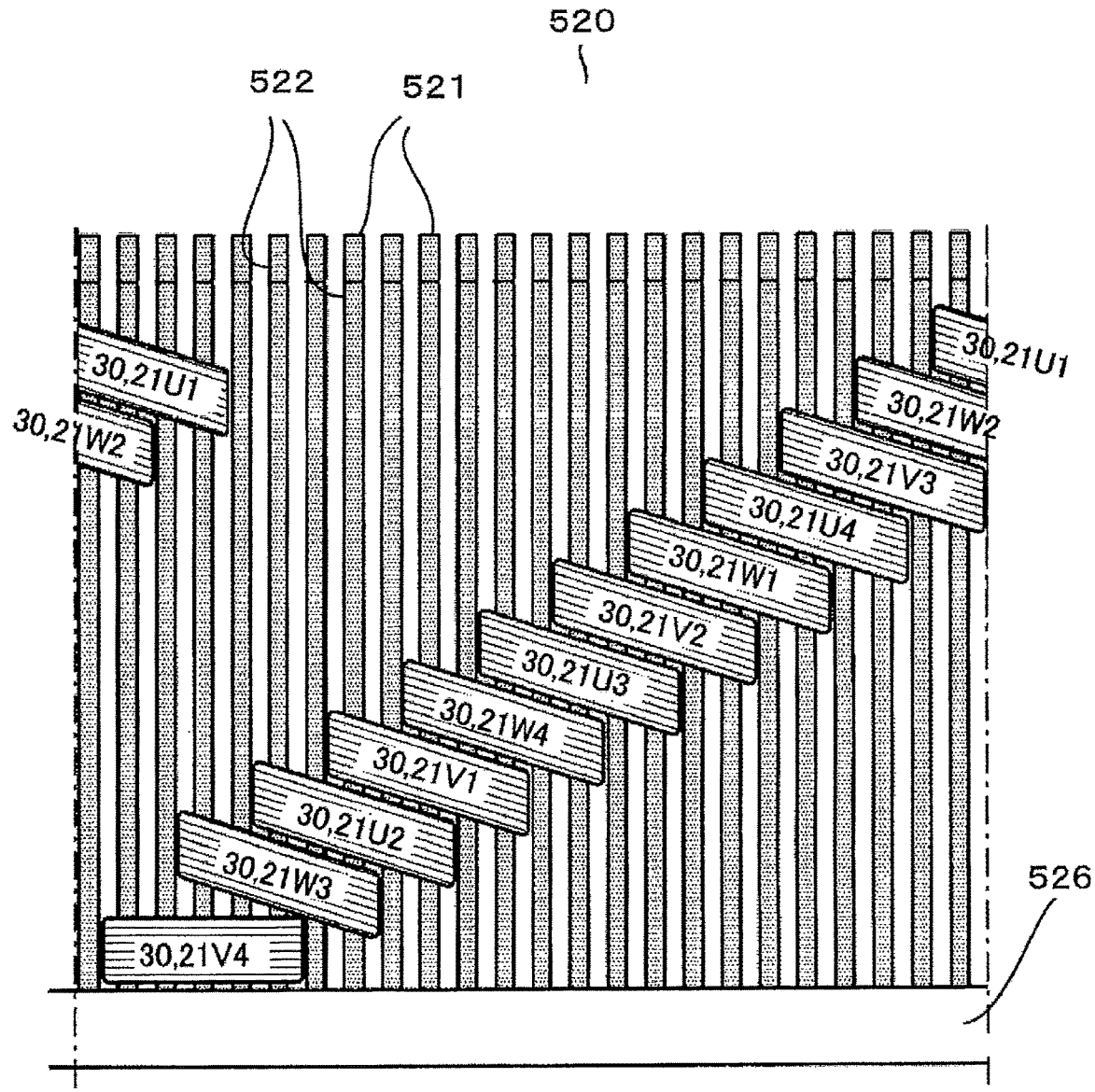
FIG. 14 is a development view of the annular conductor inserting device in which the annular conductors are arranged.
Figure 15:
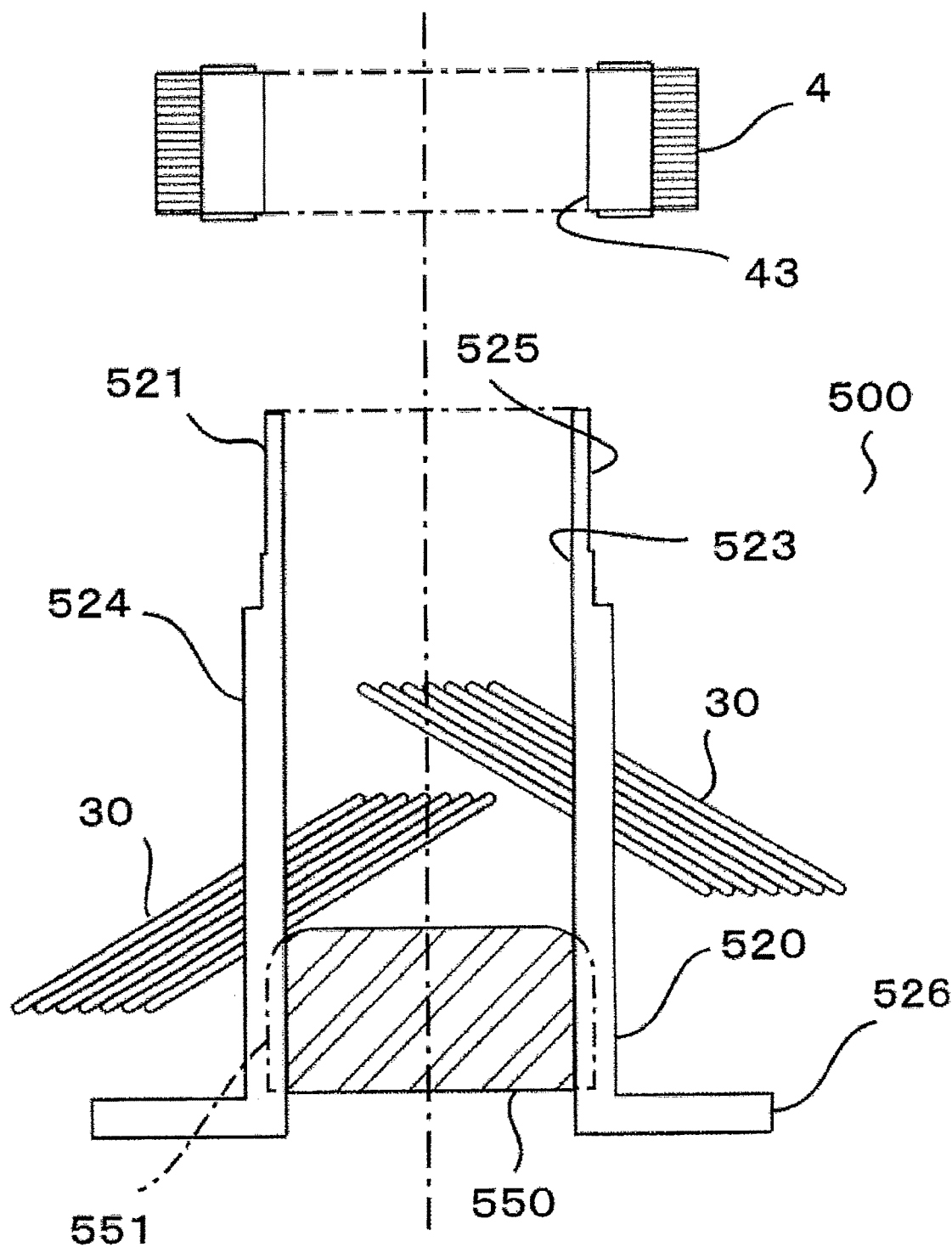
FIG. 15 illustrates the process for manufacturing the armature.
Figure 16:
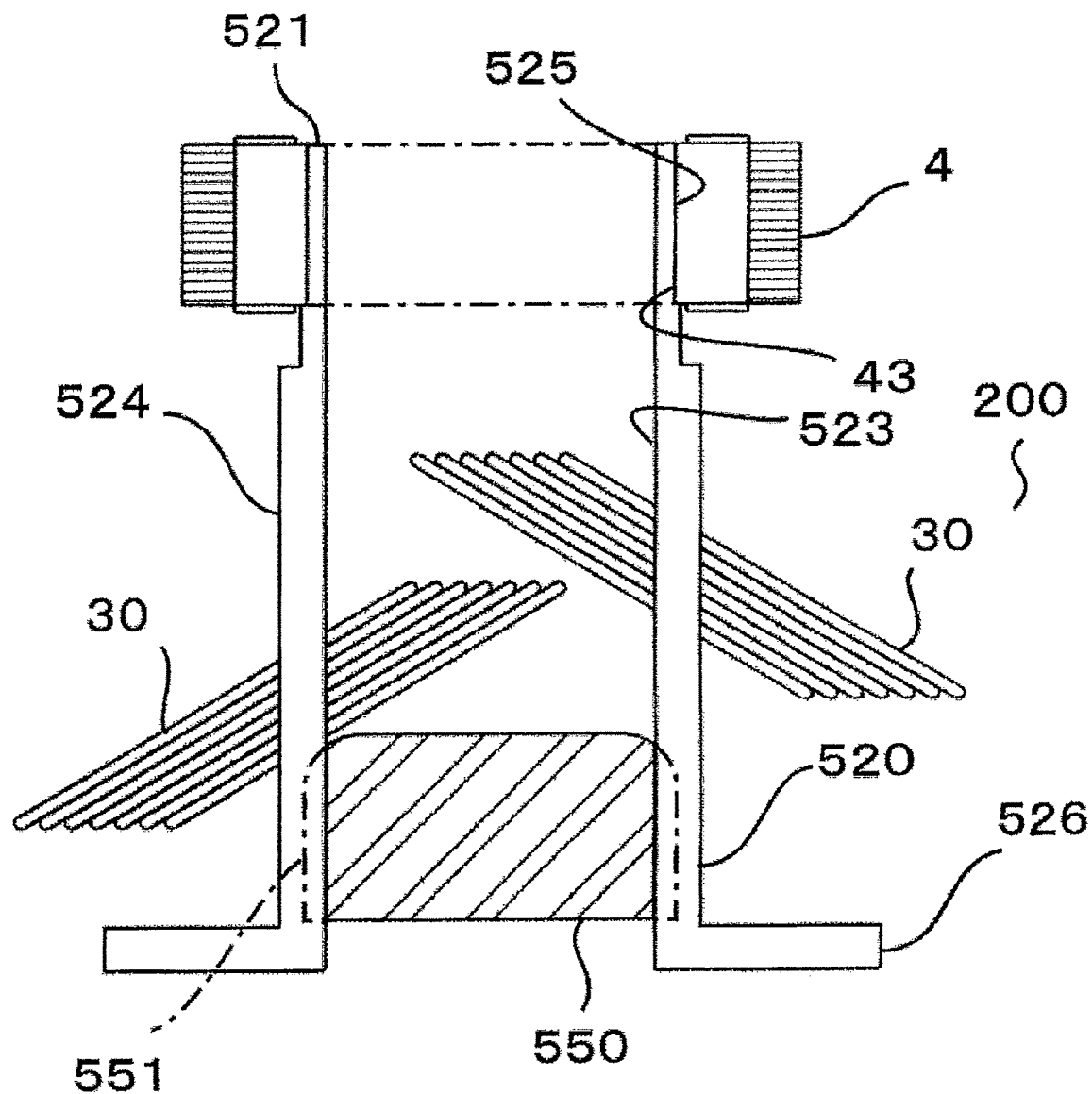
FIG. 16 illustrates the process for manufacturing the armature.

FIG. 1 to FIG. 16 show embodiment 1 for carrying out the present invention. FIG. 1 is a partial sectional view of a rotary electric machine according to embodiment 1 of the present invention. FIG. 2 is a plan view of the armature in FIG. 1. FIG. 3 is an axial-direction sectional view of the armature in FIG. 1. FIG. 4 is a plan view of a core of the armature in FIG. 2. FIG. 5 is a major part plan view of the core of the armature in FIG. 2. FIG. 6 is a detailed sectional view of a slot portion of the armature in FIG. 2. FIG. 7 is a perspective view showing the correspondence relationship between an annular conductor to be inserted into slots of the core in FIG. 4, and a coil obtained by the annular conductor being inserted into the slots. FIG. 8 is a perspective view of an annular conductor inserting device used for manufacturing the armature in FIG. 2. FIG. 9 is a perspective view of a retention guide portion in FIG. 8. FIG. 10 is a perspective view of a pusher in FIG. 8. FIG. 11 is a perspective view of the annular conductor inserting device in FIG. 8 and the core combined with each other. FIG. 12 is a flowchart illustrating a process for manufacturing the armature. FIG. 13 illustrates an order in which the annular conductors are arranged in the annular conductor inserting device in FIG. 8. FIG. 14 is a development view of the annular conductor inserting device in which the annular conductors are arranged. FIG. 15 and FIG. 16 illustrate the process for manufacturing the armature.

In FIG. 1, a rotary electric machine 100 has an armature 10, a housing 110, a rotor 120, and a bearing 130. The armature 10 (described later in detail) is fitted into the cylindrical part of the frame 112 and thus fixed thereto. The housing 110 has a bottomed cylindrical frame 112 and an end plate 113 closing the opening of the frame 112. The rotor 120 is a permanent magnet rotor including: a rotary shaft 121; a rotor core 122 fixed to the rotary shaft 121; and permanent magnets 125 embedded at a predetermined pitch along the circumferential direction on the outer circumferential surface side of the rotor core 122, and forming magnetic poles. The rotor 120 is provided inside the inner circumferential part of the armature 10, and is rotatably supported via the bearing 130 by the bottom part of the frame 112 and the end plate 113.

It is noted that the rotor 120 is not limited to a permanent magnet rotor, but may be a squirrel cage rotor in which non-insulated rotor conductors are accommodated in slots of a rotor core and are short-circuited at both sides by short-circuit rings, or may be a wound rotor in which insulated conductive wires are inserted into slots of a rotor core.

Next, the configuration of the armature 10 will be described. In FIG. 2 to FIG. 6, the armature 10 has a core 4, coils 21, a slot cell 51, and a wedge 52. In the core 4, twelve coils 21 (in FIG. 2, coils 21 connected in three phases (four coils per phase) are denoted by reference characters 21U1 to 21W4) are inserted each of which is formed by winding a conductive wire having an insulation coat into an annular shape with plural turns. As shown in FIG. 4, the core 4 is formed in a cylindrical shape by stacking, in the axial direction of the core 4, a predetermined number of electromagnetic steel sheets stamped in a round shape, and has twenty-four teeth 42 protruding inward from a cylindrical yoke portion 41, and twenty-four slots 44 formed by the teeth 42. It is noted that a cylindrical inner circumferential part 43 is formed by the radially-inner-side ends of the teeth 42. The yoke portion 41 allows a magnetic flux generated by the coils 21 to pass therethrough.

As shown in FIG. 2, each coil 21 is inserted in two (a pair of) slots 44 across a plurality of (in the present embodiment, five) teeth 42 (from another perspective, four slots 44), and the coils 21 include coils 21U1, 21U2, 21U3, 21U4 constituting U phase, coils 21V1, 21V2, 21V3, 21V4 constituting V phase, and coils 21W1, 21W2, 21W3, 21W4 constituting W phase. Thus, a stator with three phases and four poles is formed. The coils 21 are arranged with the coil 21U1 as a start point and with the coil 21V4 as an end point as shown in FIG. 2. It is noted that FIG. 2 schematically shows the state of the coil ends of the coils 21, but does not exactly show the actual shape. FIG. 3 schematically shows a sectional view of the armature 10 along A-A plane in FIG. 2. It is noted that, for convenience of illustration, only arrangement of the coil ends of the coils 21U1, 21W2, 21V4, 21U3, 21V2, 21W1 is shown in FIG. 3.

In the coils 21 of the armature 10 manufactured in the present embodiment, as shown in FIG. 2, the coil ends (indicated by thick lines) of the coil 21U1 and the coil 21V4 are concentrically arranged like concentric winding, i.e., positioned on two arcs centered at the central axis of the core 4. That is, the coil ends of the coil 21U1 and the coil 21V4 have arc shapes centered at the central axis of the core 4 as seen from the axial direction of the core 4. The coil ends of the other coils have a volute shape like lap winding in which the position of each coil end is displaced from the radially outer side to the radially inner side in the clockwise direction in FIG. 2 around the central axis of the core 4 as seen from the axial direction of the core 4.

Each slot 44 is provided with: a slot cell 51 for electrically insulating the coil 21 and the slot 44 from each other; and a wedge 52 for preventing the coil 21 from protruding out of the slot 44. The slot cell 51 and the wedge 52 are made from an insulating material such as a PET film or a meta-aramid fiber sheet, for example. Although not shown, a structure generally called cuff may be provided by bending both ends in the axial direction (direction perpendicular to the drawing sheet of FIG. 6) of the slot cell 51. This prevents a phenomenon in which, at the time of coil insertion, the slot cell 51 is shifted in the axial direction to come out of the slot.

Next, an annular conductor inserting device 500 will be described with reference to FIG. 8 to FIG. 10. As shown in FIG. 8, the annular conductor inserting device 500 includes a retention guide portion 520 and a pusher 550 (see also FIG. 10 and FIG. 16) as an engagement portion. The retention guide portion 520 has blades 521 as support members, and a base 526 as a fixation member. The blades 521 have bar shapes having a round cross section, and are arranged in a cylindrical shape with gaps 522 therebetween. One end of each blade 521 is fixed to the base 526. The retention guide portion 520 has a cylindrical inner circumferential part 523 formed by the blades 521, a cylindrical part 524, and a cylindrical stepped part 525 obtained by cutting the upper part in FIG. 9 by a predetermined dimension in the radial direction.

The length in the axial direction of the stepped part 525 is approximately the same as the length in the axial direction of the core 4, and the diameter of the stepped part 525 is slightly smaller than the diameter of the inner circumferential part 43 of the core 4. As shown in FIG. 11, the stepped part 525 and the inner circumferential part 43 of the core 4 can be fitted to each other with a slight gap therebetween in the radial direction. It is noted that the number of the blades 521 is twenty-four, and the number of the gaps 522 formed by the blades 521 is the same (twenty-four) as the number of the slots 44 of the core 4, so that, when the stepped part 525 is inserted into the inner circumferential part 43 of the core 4, the positions of the gaps 522 in the circumferential direction of the retention guide portion 520 coincide with the positions of the openings of the slots 44 of the core 4. In the retention guide portion 520 as described above, an annular conductor 30 shown in FIG. 7 is inserted into each gap 522 and thereby retained (described later in detail).

As shown in FIG. 10, the pusher 550 has a short columnar shape and has projecting portions 551 projecting in a projection line shape on the outer circumference. Each projecting portion 551 has, at an upper part thereof, a shoulder portion 552 having a mild shoulder shape. The number of the projecting portions 551 is the same as the number (twenty-four) of the gaps 522, so that, when the projecting portions 551 are inserted into the inner circumferential part 523 of the retention guide portion 520, the projecting portions 551 are fitted into the gaps 522 (see FIG. 15 and FIG. 16). The pusher 550 is driven in an up-down direction in FIG. 8 and FIG. 16, i.e., the axial direction of the retention guide portion 520, by a driving device not shown, and thereby is moved while sliding on the blades 521 of the retention guide portion 520.

Next, a method for manufacturing the armature 10 shown in FIG. 2 and FIG. 3 will be described with reference to FIG. 12 to FIG. 16. First, the core 4 (FIG. 4) and a necessary number of annular conductors 30 formed by winding a conductive wire in an annular shape, are prepared in advance. In the core 4, the slot cells 51 are inserted in advance in the slots 44 shown in FIG. 4 (see slot cell 51 in FIG. 5 and FIG. 6). As described later, each annular conductor 30 is inserted into the slots 44 of the core 4 by the annular conductor inserting device 500, and thus becomes the coil 21. The correspondence relationship between the annular conductor 30 and the coil 21 is shown side by side in FIG. 7. That is, straight portions 30a which are two sides opposite to each other in the right-left direction in FIG. 7 are inserted into the slots 44, to become slot accommodation portions 21a, and connection portions 30b connecting the two sides opposite to each other become coil ends 21b connecting the slot accommodation portions 21a.

Next, insertion and arrangement of the annular conductors 30 into the annular conductor inserting device 500 are performed by a device preparation step (step S11), a simple arrangement step (step S12), an overlap arrangement step (step S13), a fitting step (step S14), and an insertion step (step S15) in the flowchart in FIG. 12. First, in the device preparation step (step S11), the annular conductor inserting device 500 is prepared. Next, in the simple arrangement step (step S12), one annular conductor 30 is arranged in the retention guide portion 520 of the annular conductor inserting device 500. That is, as shown in FIG. 13(a), in the retention guide portion 520, the annular conductor 30 is inserted and arranged into a pair of the gaps 522 across a predetermined number of (in the present embodiment, five) blades 521. The first inserted annular conductor 30 (e.g., annular conductor 30 to be coil 21V4) moves downward while being guided by the blades 521 and stops by coming into contact with the base 526 (see FIG. 14). The conductive wire forming the annular conductor 30 is thin and has a comparatively low stiffness, and therefore, when the annular conductor 30 (21V4) is inserted into the gaps 522, the opposition interval between its straight portions 30a which are two sides opposite to each other are slightly narrowed by the blades 521 (the connection portion 30b is slightly deformed) and thus the annular conductor 30 (21V4) moves downward to be retained in an approximately horizontal state as shown in FIG. 14.

Insertion of the annular conductor 30 may be started from the gaps 522 at any positions in the retention guide portion 520, but the positions of the gaps 522 from which the insertion is started are determined in advance. In addition, the phase of the coil eventually formed by each inserted annular conductor 30 can be determined afterward, but in the following description, for convenience of description, the reference character of the phase corresponding to each coil is indicated in parentheses. It is noted that the first inserted annular conductor 30 is to be last inserted into the slots 44, and becomes the coil 21V4 after inserted into the slots 44. Therefore, in FIG. 13 and FIG. 14, this annular conductor 30 is represented as annular conductor 30 (21V4).

Subsequently, in the overlap arrangement step (step S13), the next annular conductor 30 (21W3) is inserted into the two gaps 522 so as to partially overlap the previously arranged annular conductor 30 (21V4) in the axial direction of the retention guide portion 520 (hereinafter, simply described as "overlap in the axial direction") (in this case, so as to shift by two blades 521 in the counterclockwise direction), and thus arranged in the retention guide portion 520 (see FIG. 13(b)). When the annular conductor 30 (21W3) is inserted into the gaps 522, the opposition interval between its straight portions 30a which are two sides opposite to each other is slightly expanded by the blades 521 (the connection portion 30b is slightly deformed) and thus the annular conductor 30 (21W3) moves downward to be laid on the previously arranged annular conductor 30 (21V4) (on the upper side thereof, in the axial direction of the retention guide portion 520 in FIG. 14), and thus is arranged in an inclined state in the retention guide portion 520 as shown in FIG. 14. The annular conductor 30 (21W3) becomes the coil 21W3 after inserted into the slots 44.

Hereinafter, the overlap arrangement step (step S13) is repeated to subsequently insert the annular conductors 30 into the gaps 522 (FIG. 13(b) to FIG. 13(d)), whereby all the eleven annular conductors 30 in the overlap arrangement step are arranged in a spiral shape in the retention guide portion 520. As shown in FIG. 13 and FIG. 14, the finally inserted (arranged) annular conductor 30 (21U1) is located above (upward in the axial direction of the retention guide portion 520) the annular conductor 30 (21V4) first arranged in the retention guide portion 520. It is noted that the simple arrangement step and the overlap arrangement step correspond to an arrangement step in the present invention. It is noted that, as described later, the annular conductor 30 (21V4), the annular conductor 30 (21W3), . . . , and the annular conductor 30 (21U1) sequentially inserted into the gaps 522 and retained by the retention guide portion 520 (blades 521) become the coil 21V4, the coil 21W3, . . . , and the coil 21U1 after inserted into the slots 44 (see FIG. 2). Thus, by combination of the simple arrangement step (step S11) and the overlap arrangement step (step S12), all the annular conductors 30 for forming a predetermined number of coils 21 needed for the armature 10 are arranged in the retention guide portion 520. It is noted that, in FIG. 14, for facilitating the understanding, the annular conductors 30 (21V4) to 30 (21U1) are shown with slight gaps therebetween in the insertion direction (up-down direction in FIG. 14), but actually, they are in contact with each other.

After arrangement of the annular conductors 30 into the retention guide portion 520 is finished, in the fitting step (step S14), the retention guide portion 520 and the core 4 are fitted to each other. That is, as shown in FIG. 15, the core 4 is positioned above the retention guide portion 520 in which the annular conductors 30 are arranged, and then the core 4 is moved downward so that the inner circumferential part 43 of the core 4 and the stepped part 525 of the retention guide portion 520 are fitted to each other, thus leading to a state shown in FIG. 16. The stepped part 525 is fitted to the inner circumferential part 43 of the core 4 in a loose-fit state with a slight gap therebetween in the radial direction. At this time, the positions in the circumferential direction of the slots 44 of the core 4 are made to coincide with the positions in the circumferential direction of the gaps 522 of the retention guide portion 520. As a result, the positions in the circumferential direction of the blades 521 coincide with the positions of the teeth 42 (FIG. 4). It is noted that FIG. 14 and FIG. 15 schematically show the state of the annular conductors 30 retained (arranged) in the retention guide portion 520.

Thereafter, in the insertion step (step S15), the pusher 550 is driven upward (upward in the axial direction of the retention guide portion 520) in FIG. 16 by the driving device not shown, so that the connection portions 30b (FIG. 7) of the annular conductors 30 are moved upward by being caught on the shoulder portions 552 of the pusher 550, whereby the annular conductors 30 are inserted into the slots 44. Along with the upward movement of the pusher 550, the annular conductors 30 move upward while being guided by the blades 521, and are extruded outward in the radial direction of the retention guide portion 520, thereby to be inserted into the corresponding slots 44. The annular conductors 30 thus inserted in the slots 44 become the coils 21 (see FIG. 7 and FIG. 2).

As described above, the annular conductor 30 (21U1) last arranged in the retention guide portion 520 is first inserted into the slots 44 and becomes the coil 21U1, and as seen from the axial direction of the core 4, the coil end thereof (represented by a thick line and indicated by the reference character 21U1 of the coil) has an arc shape centered at the axis of the core 4, and is located on the radially outer side of the core 4 relative to the coil ends of any other coils 21 (coils 21V3, 21W2, 21V4, 21W3) that overlap the coil 21U1 in the radial direction of the core 4. It is noted that, in FIG. 2, the coil ends of the coils 21 are indicated by the reference characters of the respective coils, e.g., the coil end of the coil 21U1 is indicated by the reference character 21U1.

The annular conductor 30 (21V4) first arranged in the retention guide portion 520 is last inserted into the slots 44 and becomes the coil 21V4, and as seen from the axial direction of the core 4, the coil end thereof (in FIG. 2, represented by a thick line and indicated by the reference character 21V4 of the coil) has an arc shape centered at the axis of the core 4, and is located on the radially inner side of the core 4 relative to the coil ends of any other coils (coils 21W2, 21U1, 21W3, 21U2) that overlap the coil 21V4 in the radial direction of the core 4. The coil ends of the coils other than the coil 21U1 and the coil 21V4 have a volute shape such that the radius thereof gradually reduces in the clockwise direction as seen from the axial direction of the core 4. It is noted that the winding of the armature is formed by the above plurality of (in the present embodiment, twelve) coils 21.

After the coils 21 are thus formed by the annular conductors 30 being inserted into the slots 44 of the core 4, the wedge 52 shown in FIG. 6 is inserted into the opening of each slot 44, whereby the armature 10 having the coils 21 and the core 4 as shown in FIG. 2 is obtained. It is noted that, thereafter, the coils 21 for the respective phases are three-phase connected by jumper wires, to complete the armature. However, description and illustration of the three-phase connection are omitted.

Embodiment 2

Figure 17:
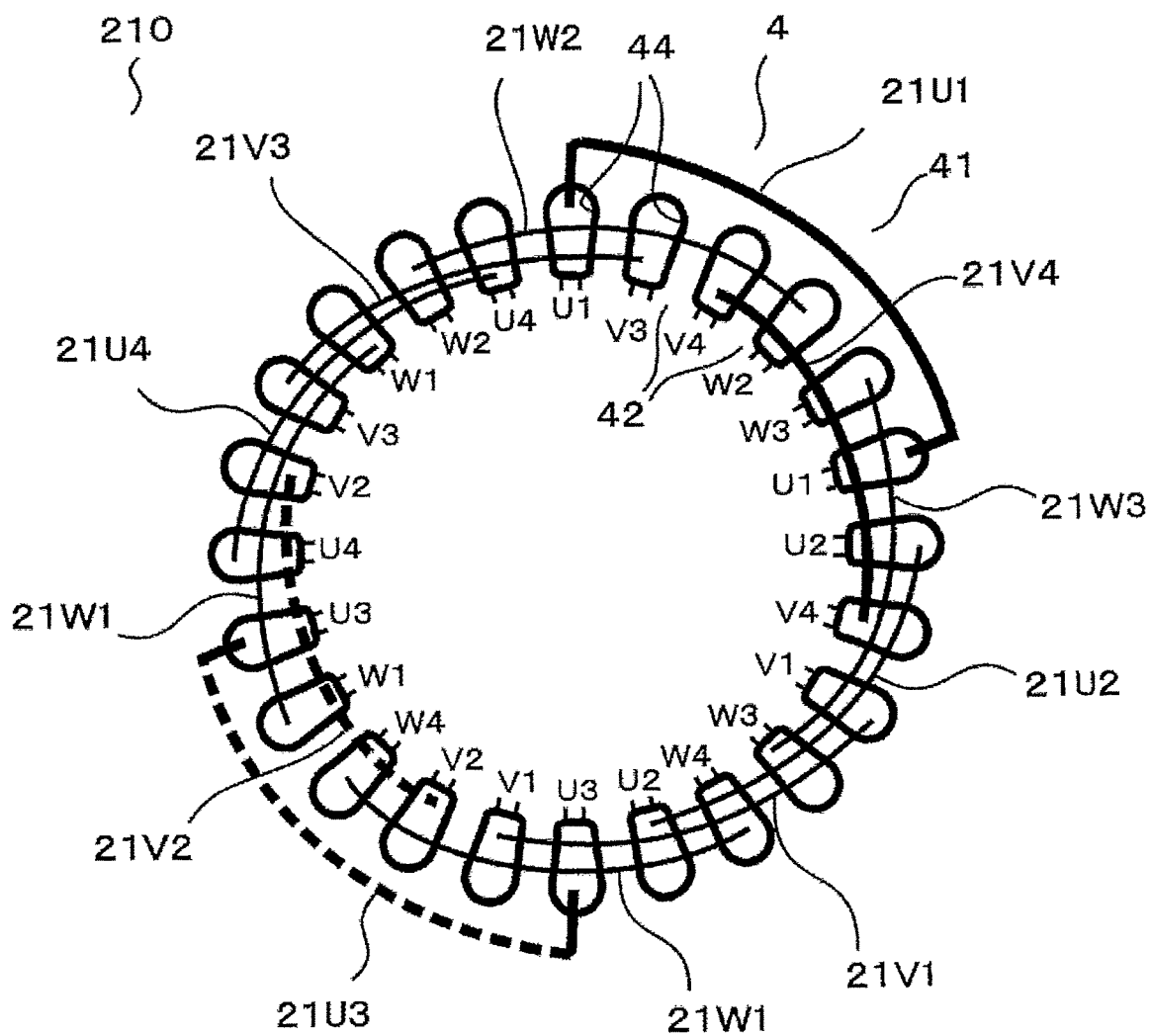
FIG. 17 is a plan view of an armature according to embodiment 2.
Figure 18:
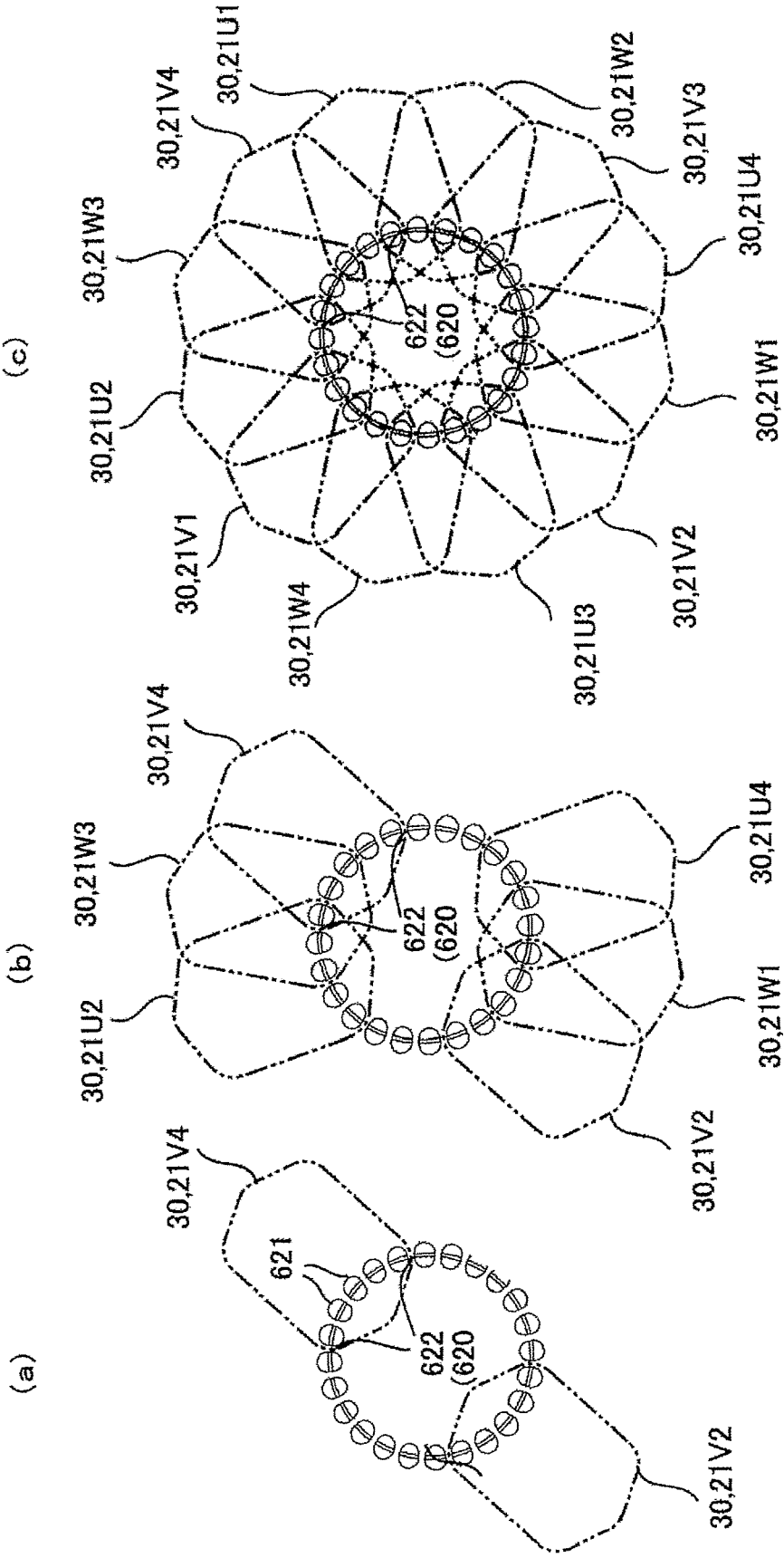
FIG. 18 illustrates an order in which annular conductors are arranged in an annular conductor inserting device.
Figure 19:
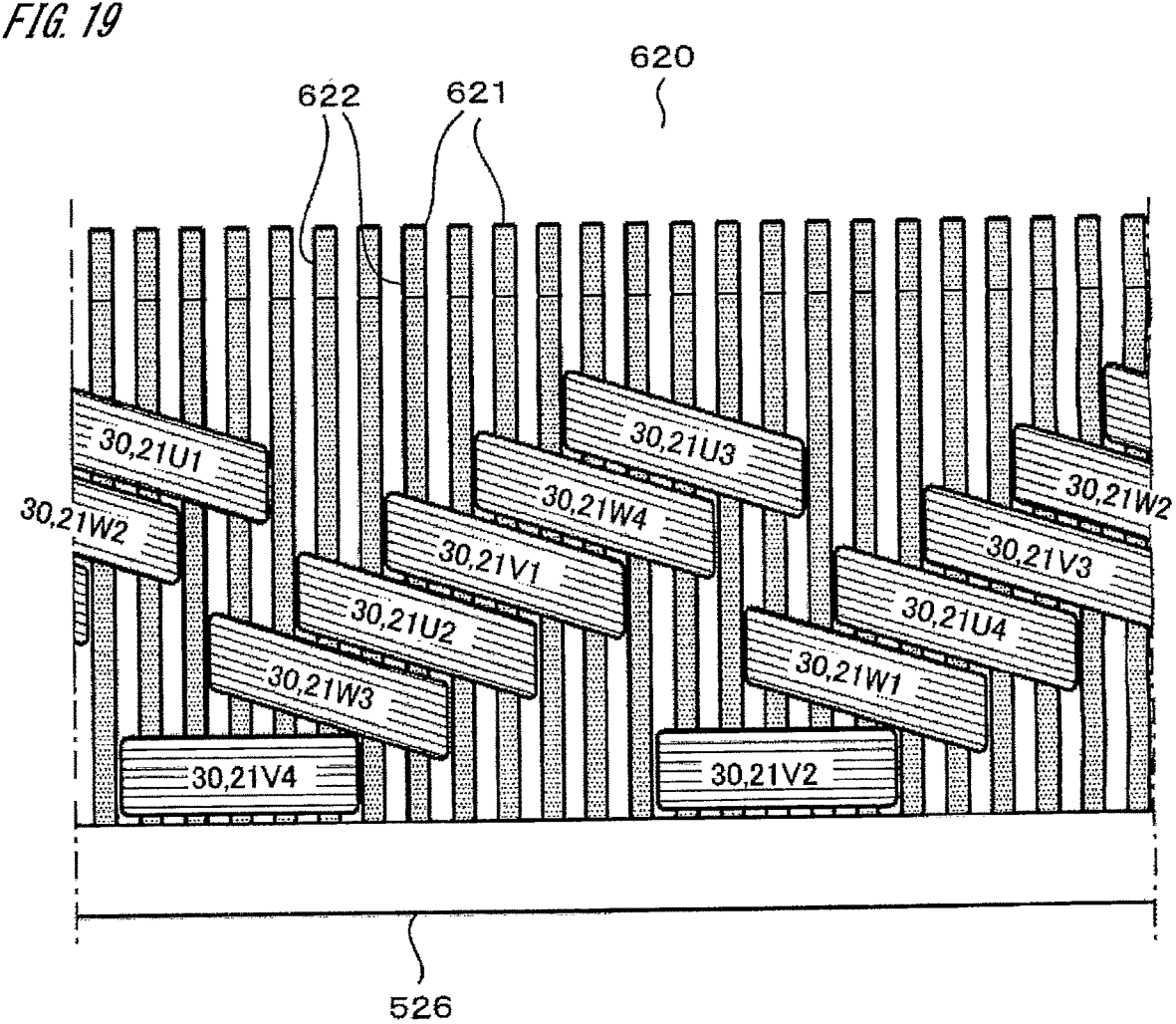
FIG. 19 is a development view of the annular conductor inserting device in which the annular conductors are arranged.

FIG. 17 to FIG. 19 show embodiment 2. FIG. 17 is a plan view of the armature. FIG. 18 illustrates an order in which annular conductors are arranged in an annular conductor inserting device. FIG. 19 is a development view of the annular conductor inserting device in which the annular conductors are arranged. In FIG. 17, among coils 21 of an armature 210, a total of four coils 21 having arc-shaped coil ends concentrically arranged around the axis of the core 4 are provided at two locations in the circumferential direction. Specifically, the four coils 21 are a coil 21U1 and a coil 21V4 (these coils 21 are represented by thick solid lines) and a coil 21U3 and a coil 21V2 (these coils 21 are represented by thick dot lines).

By thus arranging the coils 21 such that the coil ends thereof have concentric arc shapes, when the annular conductors 30 are arranged and retained in the retention guide portion 620, the annular conductors 30 can be arranged in a double spiral shape as shown in FIG. 18 and FIG. 19, and thus, the height of the annular conductors 30 (the dimension in the axial direction of the retention guide portion 620) when the annular conductors 30 are arranged in the retention guide portion 620 is halved as compared to embodiment 1. It is noted that the retention guide portion 620 is the same as the retention guide portion 520 except that the lengths of blades 621 and gaps 622 are shorter than the lengths of the blades 521 and the gaps 522 of the retention guide portion 520 shown in FIG. 9. Further, the annular conductor inserting device in the present embodiment is the same as the annular conductor inserting device 500 shown in FIG. 8 except for the difference in the retention guide portion 620.

Next, a method for arranging the annular conductors 30 in the above retention guide portion 620 will be described. First, as shown in FIG. 18(a), one annular conductor 30 (21V4) is inserted into any one pair of the gaps 622 across five blades 621 (four gaps 622) of the retention guide portion 620, and thus arranged in the retention guide portion 620.

Then, the next annular conductor 30 (21V2) is arranged in a pair of gaps 622 at positions axially symmetric to the positions at which the annular conductor 30 (21V4) has been previously inserted, with respect to the center axis of the retention guide portion 620 (FIG. 18(a)) (the operation thus far is the simple arrangement step). It is noted that the annular conductor 30 (21V4) and the annular conductor 30 (21V2) may be arranged at the same time (simple arrangement step), and in this case, time taken for the arrangement is shortened as a whole.

Next, the annular conductor 30 (21W3) is arranged so as to partially overlap the annular conductor 30 (21V4) in the axial direction of the retention guide portion 620 (overlap arrangement step), and the annular conductor 30 (21U2) is arranged so as to partially overlap the annular conductor 30 (21W3). In parallel, the annular conductor 30 (21W1) is arranged so as to partially overlap the annular conductor 30 (21V2), and the annular conductor 30 (21U4) is arranged so as to partially overlap the annular conductor 30 (21W1). Thus, the annular conductors 30 are sequentially arranged in the retention guide portion 620 (FIG. 18(b)) (repetition of overlap arrangement step). By continuing such arrangement operation, the annular conductors 30 are arranged up to the positions where the last annular conductor 30 (21U3) partially overlaps the first arranged annular conductor 30 (21V2) in the axial direction of the retention guide portion 620, and the last annular conductor 30 (21U1) partially overlaps the first inserted annular conductor 30 (21V4) in the axial direction of the retention guide portion 620 (FIG. 18(c)). By performing also the above overlap arrangement step by parallel works, time taken for the arrangement can be halved. Thus, by combination of the simple arrangement step and the overlap arrangement step, all the annular conductors 30 for forming a predetermined number of coils 21 needed for the armature 210 are arranged in the retention guide portion 620. Regarding the annular conductors 30 (21W3) to 30 (21U3) and the annular conductors 30 (21W1) to 30 (21U1) which are arranged in the overlap arrangement step, as in embodiment 1, when each annular conductor 30 is inserted into the gaps 522, the opposition interval between the straight portions 30a which are two sides opposite to each other is slightly expanded by the blades 521 and thus the annular conductor 30 moves downward.

FIG. 19 shows a side development view of the retention guide portion 620 in which the annular conductors 30 are arranged by making one round around the retention guide portion 620 as described above. Also in this case, the first arranged annular conductors 30 (21V4) and 30 (21V2) are supported in an approximately horizontal state by the blades 621, and the annular conductors 30 arranged in the subsequent overlap arrangement step are supported in an inclined state by the blades 621, so that two sets of the annular conductors 30 are arranged in spiral shapes along the circumferential direction. It is noted that, in FIG. 19, the annular conductors 30 (21V4) to 30 (21U3) and the annular conductors 30 (21V2) to 30 (21U1) are shown with slight gaps therebetween in the insertion direction, but actually, they are in contact with each other. As in embodiment 1, the retention guide portion 620 in which the annular conductors 30 are arranged as shown in FIG. 19 is fitted to the core 4 (fitting step), and the annular conductors 30 are pushed upward by a pusher similar to the pusher 550 shown in FIG. 10, to be inserted into the slots 44 of the core 4, thus obtaining the coils 21 (21U1 to 21W4) shown in FIG. 17 (insertion step).

In this case, the coil end (represented by a thick solid line) of the annular conductor 30 (21U1) and the coil end (represented by a thick dot line) of the annular conductor 30 (21U3) which are last arranged in the retention guide portion 620 as shown in FIG. 17 are located at different positions in the circumferential direction (in the present embodiment, positions symmetric with respect to the axis of the core 4) so as not to overlap each other in the axial direction of the core 4. In addition, the coil end (represented by a thick solid line) of the annular conductor 30 (21V4) and the coil end (represented by a thick dot line) of the annular conductor 30 (21V2) which are first arranged in the retention guide portion 620 are located at different positions in the circumferential direction (in the present embodiment, positions symmetric with respect to the axis of the core 4) so as not to overlap each other in the axial direction of the core 4.

In the above description, as the annular conductors 30 to be first arranged in the retention guide portion 620, one annular conductor 30 is provided at each of two locations. However, the arrangement may be performed as follows. Three annular conductors 30 are arranged at angular intervals of 120 degrees at the same time (simple arrangement step). Then, using the three annular conductors 30 as a reference, the annular conductors 30 are sequentially arranged so as to partially overlap the previously arranged annular conductors 30 in the axial direction of the retention guide portion 620, simultaneously at three locations. The annular conductors 30 are thus arranged up to the positions that partially overlap the first arranged annular conductors 30 in the axial direction, whereby the arrangement is finished (the operation thus far is the overlap arrangement step).

According to the arrangement of the annular conductors 30 as described above, when the annular conductors 30 are arranged in the retention guide portion 620, the annular conductors 30 can be arranged (retained) in a double or multiple spiral shape as shown in FIG. 19, so that the height of the annular conductors 30 is equal to or smaller than half that in embodiment 1. Thus, there is an advantage that the length of the blades 621 can be shortened. In addition, the annular conductors 30 are sequentially arranged simultaneously, using a plurality of (two or three) first arranged annular conductors 30 as a reference, whereby time taken for the arrangement of the annular conductors 30 can be shortened to be one second or one third, and thus the manufacturing time can also be shortened.

Embodiment 3

Figure 20:
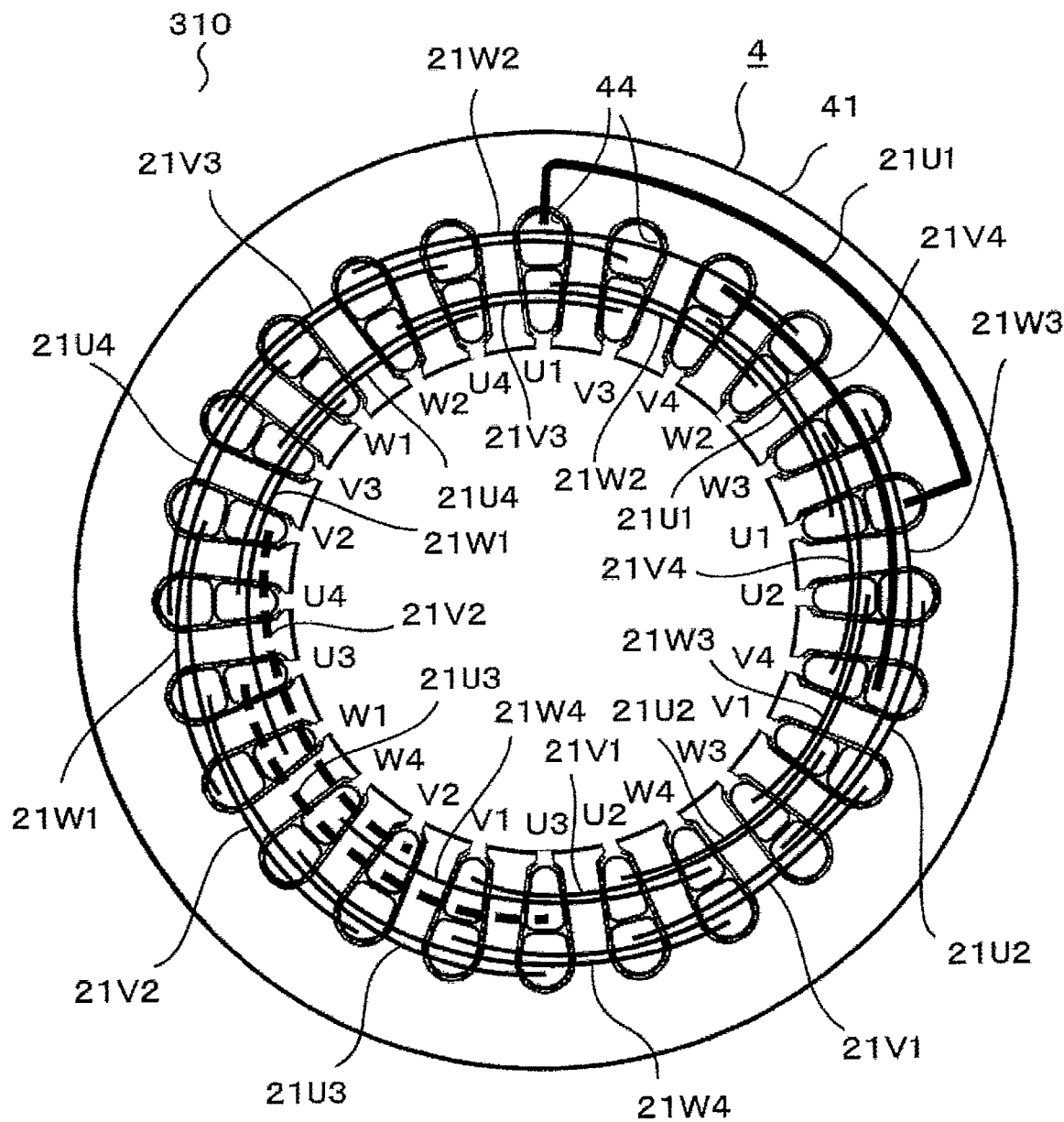
FIG. 20 is a plan view of an armature according to embodiment 3.
Figure 21:
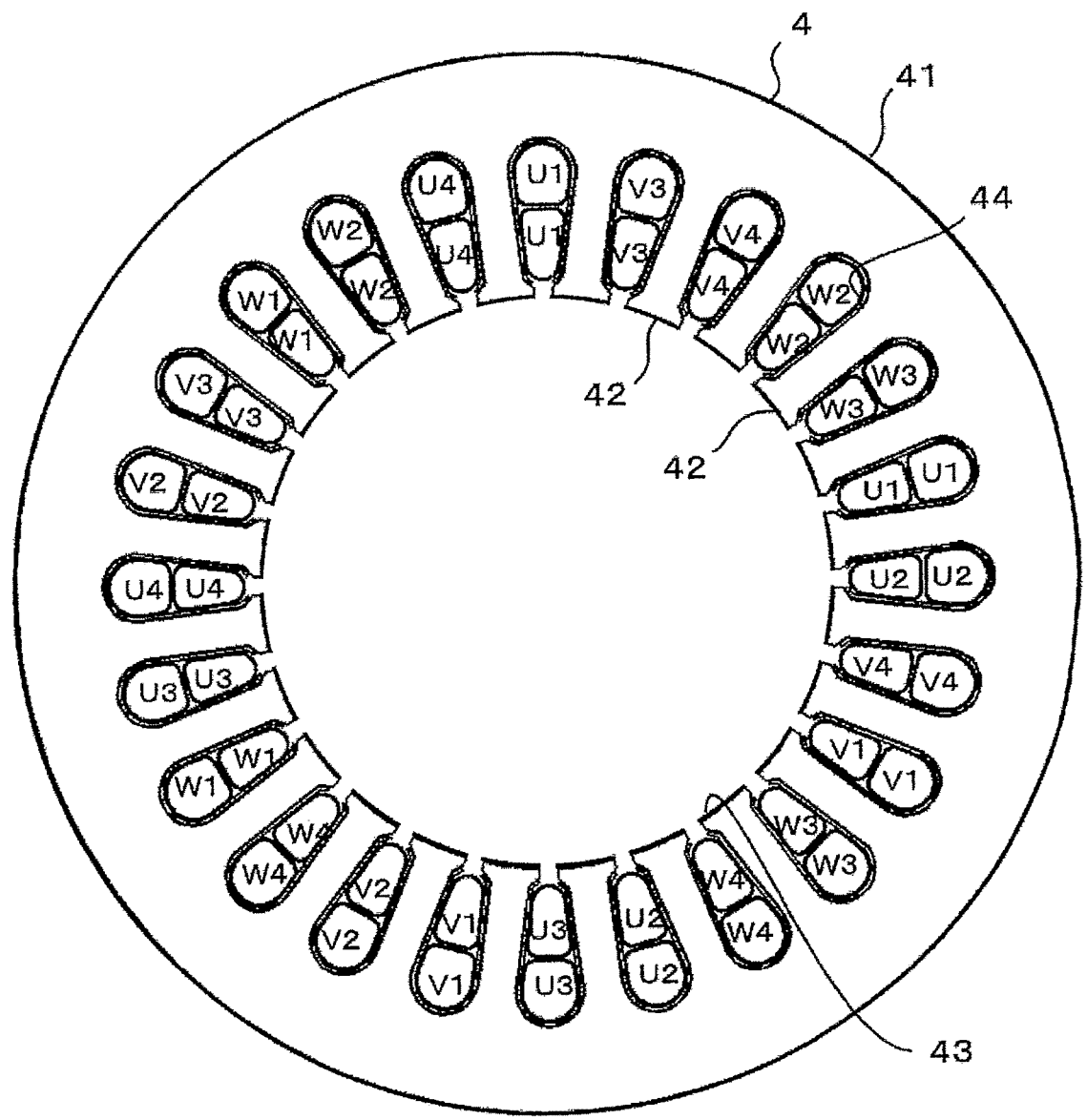
FIG. 21 is a plan view of a core of the armature in FIG. 20.
Figure 22:
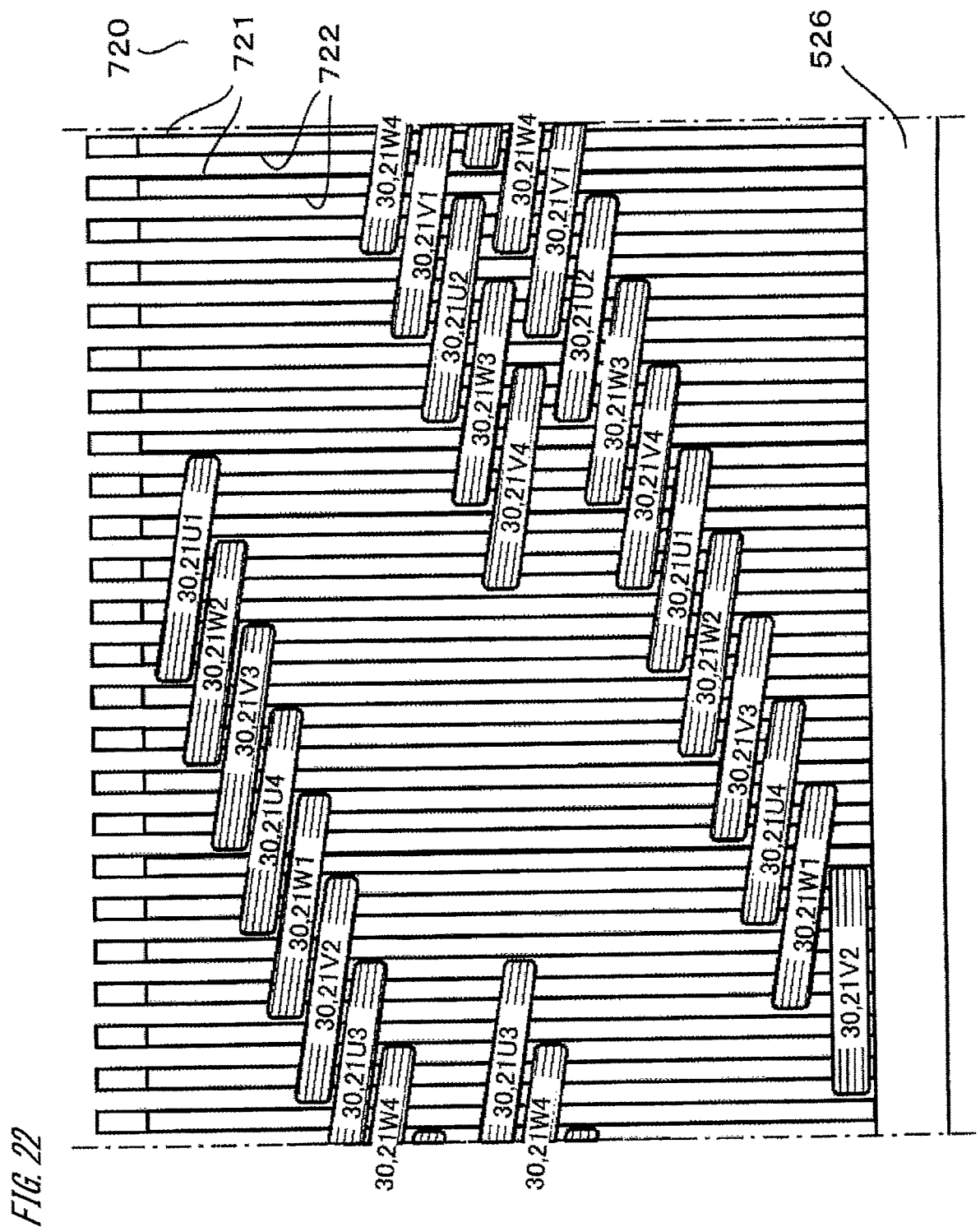
FIG. 22 is a development view of an annular conductor inserting device in which annular conductors are arranged.

FIG. 20 to FIG. 22 show embodiment 3. FIG. 20 is a plan view of an armature. FIG. 21 is a plan view of a core of the armature in FIG. 20. FIG. 22 is a development view of an annular conductor inserting device in which annular conductors are arranged. In FIG. 20, in an armature 310, two coils 21 are arranged in each identical slot 44. The arrangement relationship of the coil ends of the coils 21 on the deep sides (radially outer side of core 4) of the slots 44 is the same as that in embodiment 1 shown in FIG. 2. The arrangement relationship of the coil ends of the coils 21 on the opening sides (radially inner side of core 4) of the slots 44 is equal to a relationship obtained by rotating the arrangement relationship of the coil ends of the coils 21 on the deep sides (radially outer side of core 4) by 180 degrees in the counterclockwise direction. In this case, four coils 21 having arc-shaped coil ends concentrically arranged around the axis of the core 4 as seen from the axial direction of the core 4 are provided in the circumferential direction. The four coils 21 are a coil 21U1 and a coil 21V4 (represented by thick solid lines) and a coil 21U3 and a coil 21V2 (represented by thick dot lines).

Next, a method for arranging the annular conductor 30 in a retention guide portion 720 (FIG. 22) of the annular conductor inserting device will be described. It is noted that the retention guide portion 720 is the same as the retention guide portion 520 except that the lengths of blades 721 and gaps 722 are shorter than the lengths of the blades 521 and the gaps 522 of the retention guide portion 520 shown in FIG. 8. In addition, the annular conductor inserting device in the present embodiment is the same as the annular conductor inserting device 500 shown in FIG. 8 except for the difference in the retention guide portion 720. First, as shown in FIG. 22, one annular conductor 30 (21V2) is inserted and arranged into any one pair of gaps 522 across five blades 721 of the retention guide portion 720 (simple arrangement step in first round). Next, the annular conductor 30 (21W1) is arranged so as to partially overlap the annular conductor 30 (21V2) in the axial direction of the retention guide portion 720 (overlap arrangement step in first round), and the annular conductor 30 (21U4) is arranged in the retention guide portion 720 so as to partially overlap the annular conductor 30 (21W1) (repetition of overlap arrangement step in first round).

By continuing such operation, the annular conductors 30 are arranged until the last annular conductor 30 (21U3) partially overlaps the first arranged annular conductor 30 (21V2) in the axial direction. Thus, the annular conductors 30 are arranged over the entire circumference of the retention guide portion 720, whereby the arrangement of the annular conductors 30 in the first round is finished. Subsequently, arrangement of the annular conductors 30 in the second round is performed. As a start position, the annular conductor 30 (21V4) is arranged at a position (in the present embodiment, a position axially symmetric to the annular conductor 30 (21V2) with respect to the axis of the retention guide portion 720) shifted in the circumferential direction of the retention guide portion 720 so as not to overlap the first arranged annular conductor 30 (21V2) in the axial direction of the retention guide portion 720 (simple arrangement step in second round). Hereinafter, the annular conductors 30 are sequentially arranged in the same manner as in the first round (repetition of overlap arrangement step in second round), so that the annular conductors 30 are arranged in a spiral shape by two rounds in the retention guide portion 720 as shown in FIG. 22. Regarding the annular conductors 30 (21W1) to 30 (21U3) and the annular conductors 30 (21V4) to 30 (21U1) which are arranged in the overlap arrangement step, as in embodiment 1, when each annular conductor 30 is inserted into the gaps 522, the opposition interval between the straight portions 30a which are two sides opposite to each other is slightly expanded by the blades 521 and thus the annular conductor 30 moves downward. In FIG. 22, the annular conductors 30 (21V2) to 30 (21U3) and the annular conductors 30 (21V4) to 30 (21U1) are shown with slight gaps therebetween in the insertion direction, but actually, they are in contact with each other. Thus, by combination of the simple arrangement step and the overlap arrangement step, all the annular conductors 30 for forming a predetermined number of coils 21 needed for the armature 310 are arranged in the retention guide portion 720. The subsequent works are the same as those in embodiment 1 or 2, and the armature 310 shown in FIG. 20 is manufactured.

As shown in FIG. 20, the coils 21 are arranged in two layers in the radial direction. In such arrangement, the positions of the coil ends (represented by thick solid lines) of the coil 21U3 and the coil 21V2 are shifted from the positions of the coil ends (represented by thick solid lines) of the coil 21U1 and the coil 21V4 which have concentric arc-shapes which would increase interference between the coil ends. Thus, these coil ends can be dispersed in the circumferential direction of the core 4, whereby the radial-direction dimension of the coil ends can be reduced and therefore the armature 310 can be downsized.

In addition, as shown in FIG. 22, when the annular conductors 30 are arranged in the retention guide portion 720, the annular conductor 30 (21V4) to be first arranged in the second round, which is to be a coil in the radially-outer-side layer of the core 4, can be started to be arranged from a halfway position (annular conductor 30 (21V4) in FIG. 22) in the arrangement of the annular conductors 30 in the first round. Therefore, the lengths of the blades 721 can be shortened as compared to the case of the arrangement of the annular conductors 30 in embodiment 1.

Embodiment 4

Figure 23:
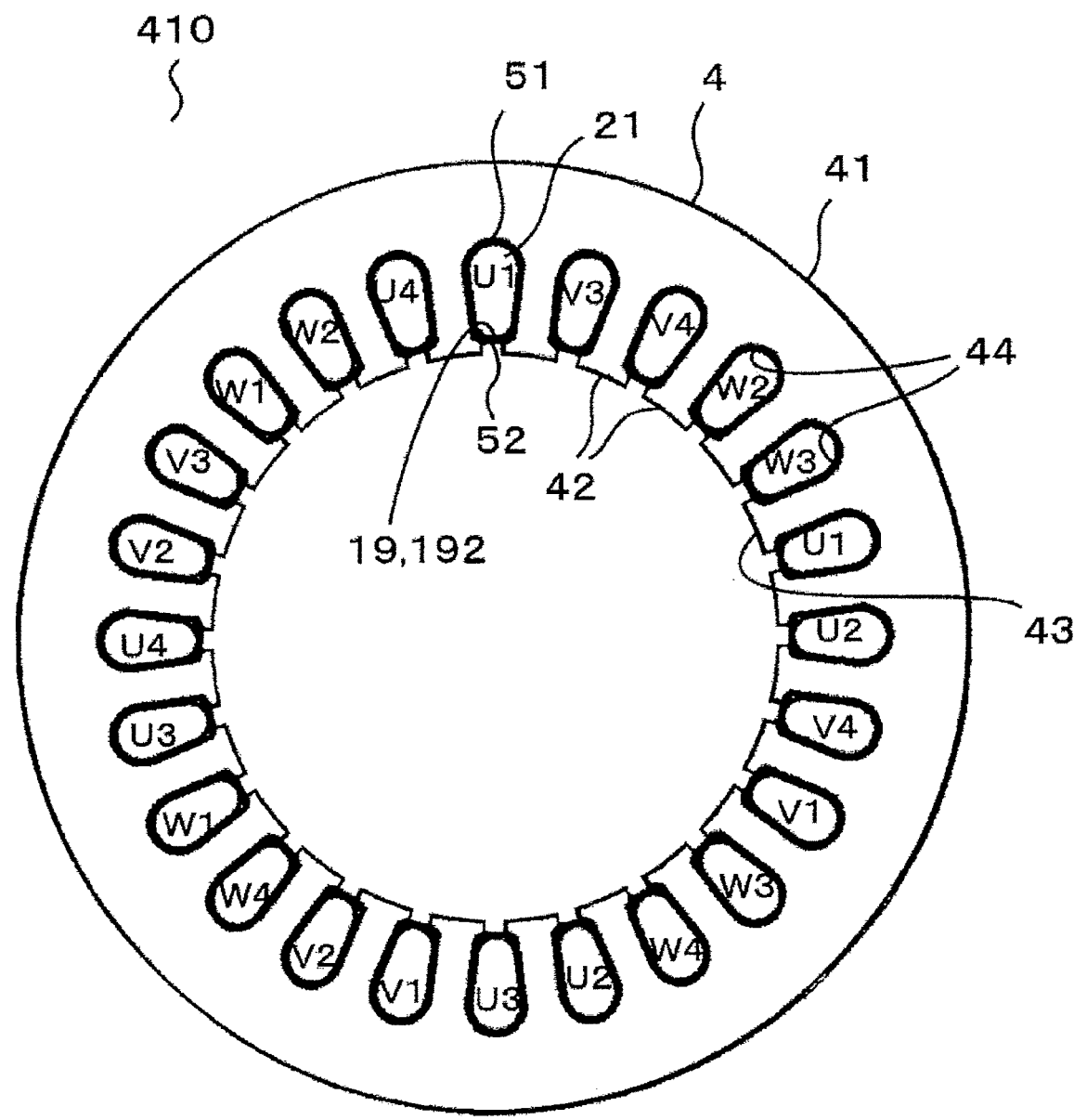
FIG. 23 is a sectional view of an armature according to embodiment 4.
Figure 24:
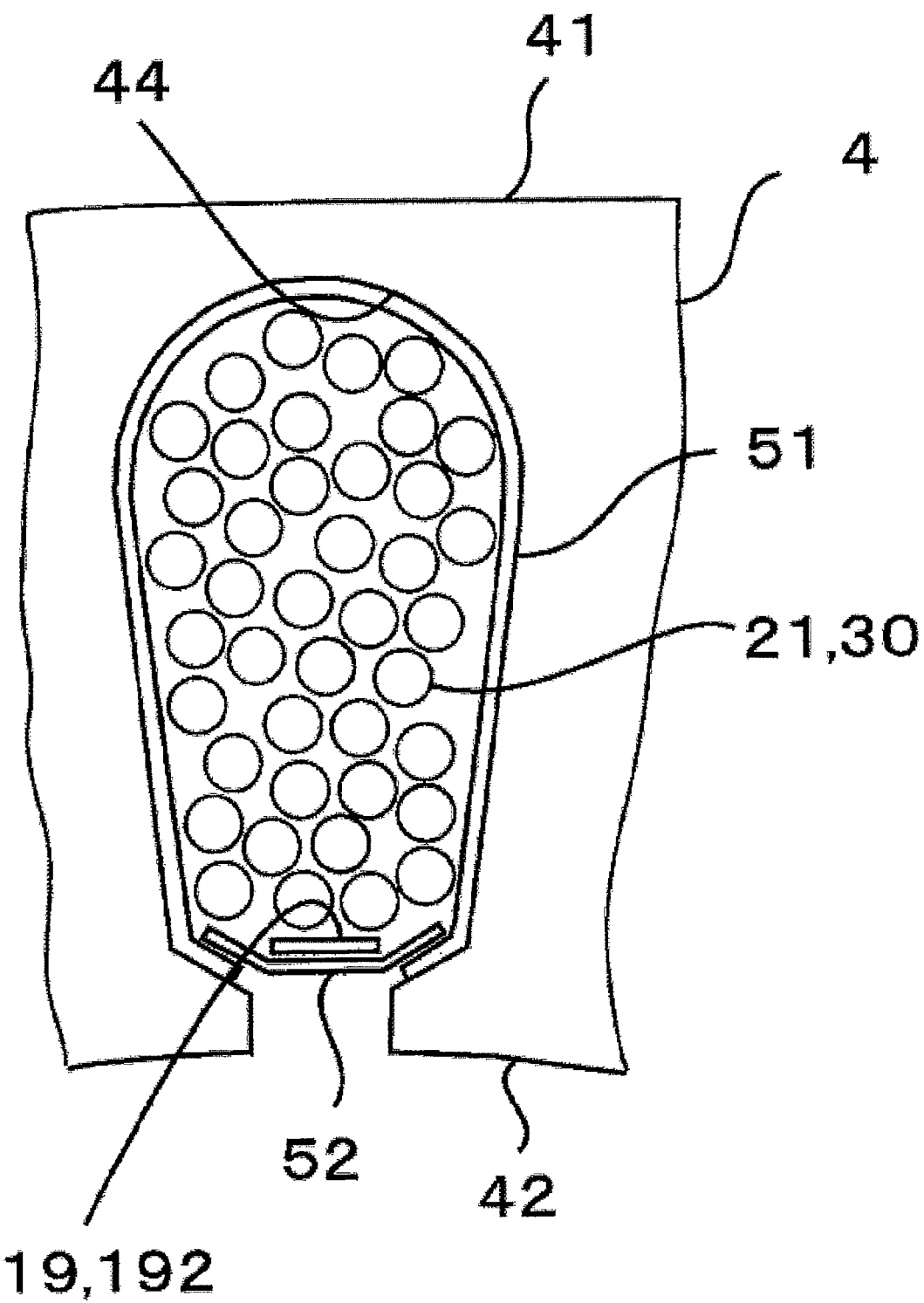
FIG. 24 is a detailed sectional view of a slot portion of the armature in FIG. 23.
Figure 25:
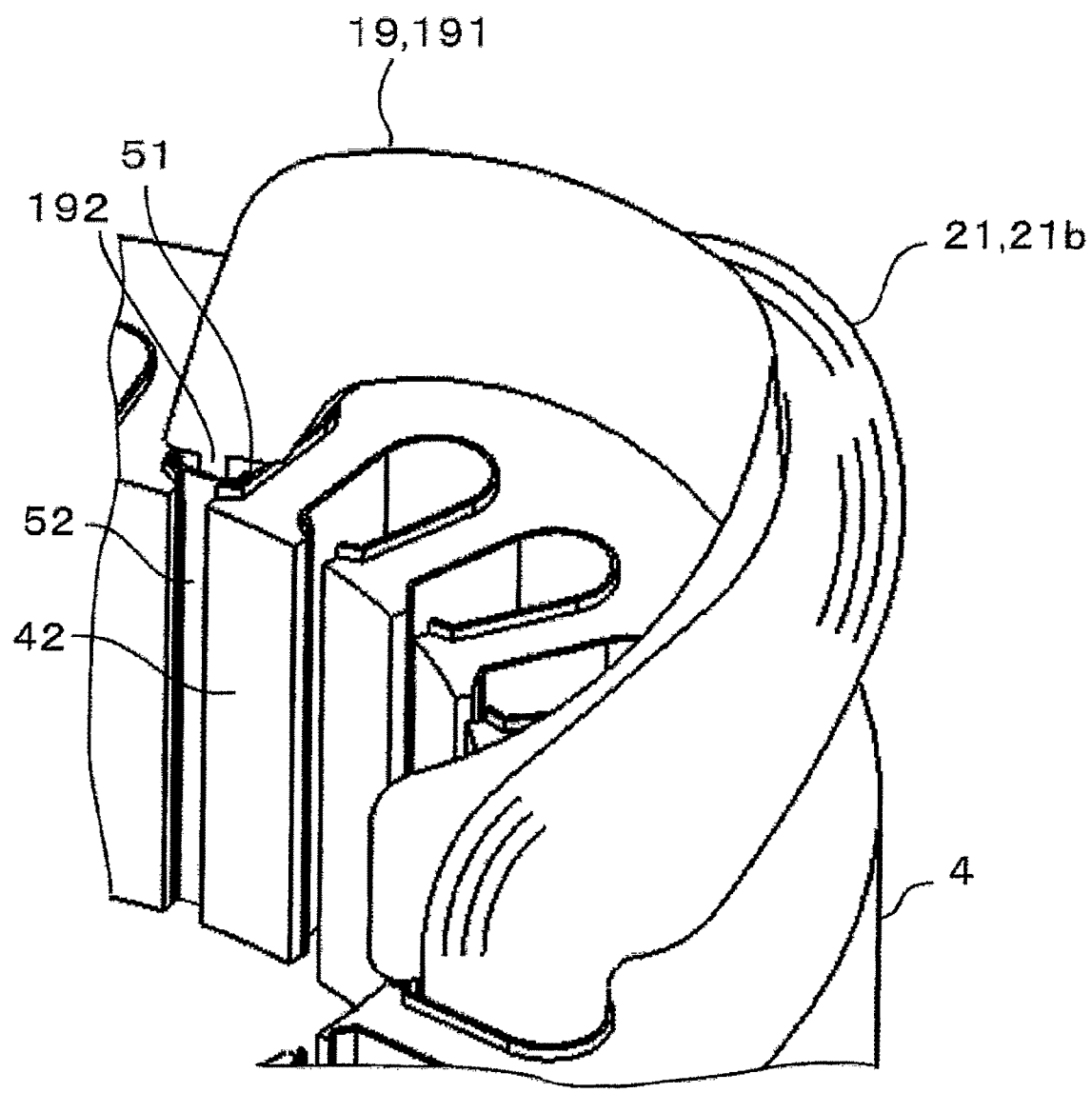
FIG. 25 is a perspective view around a coil end of the armature according to embodiment 4.
Figure 26:
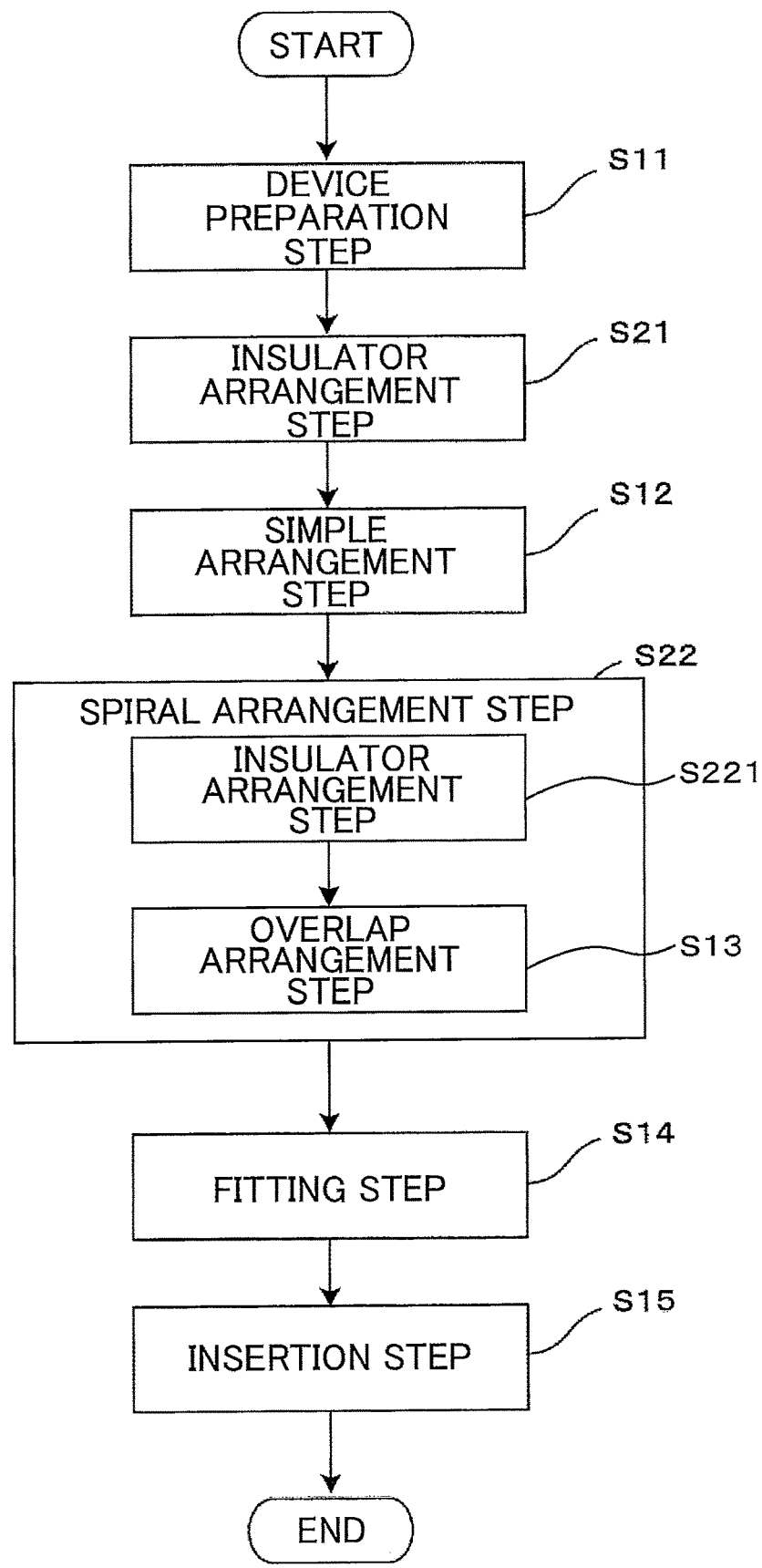
FIG. 26 is a flowchart illustrating a process for manufacturing the armature according to embodiment 4.
Figure 27:
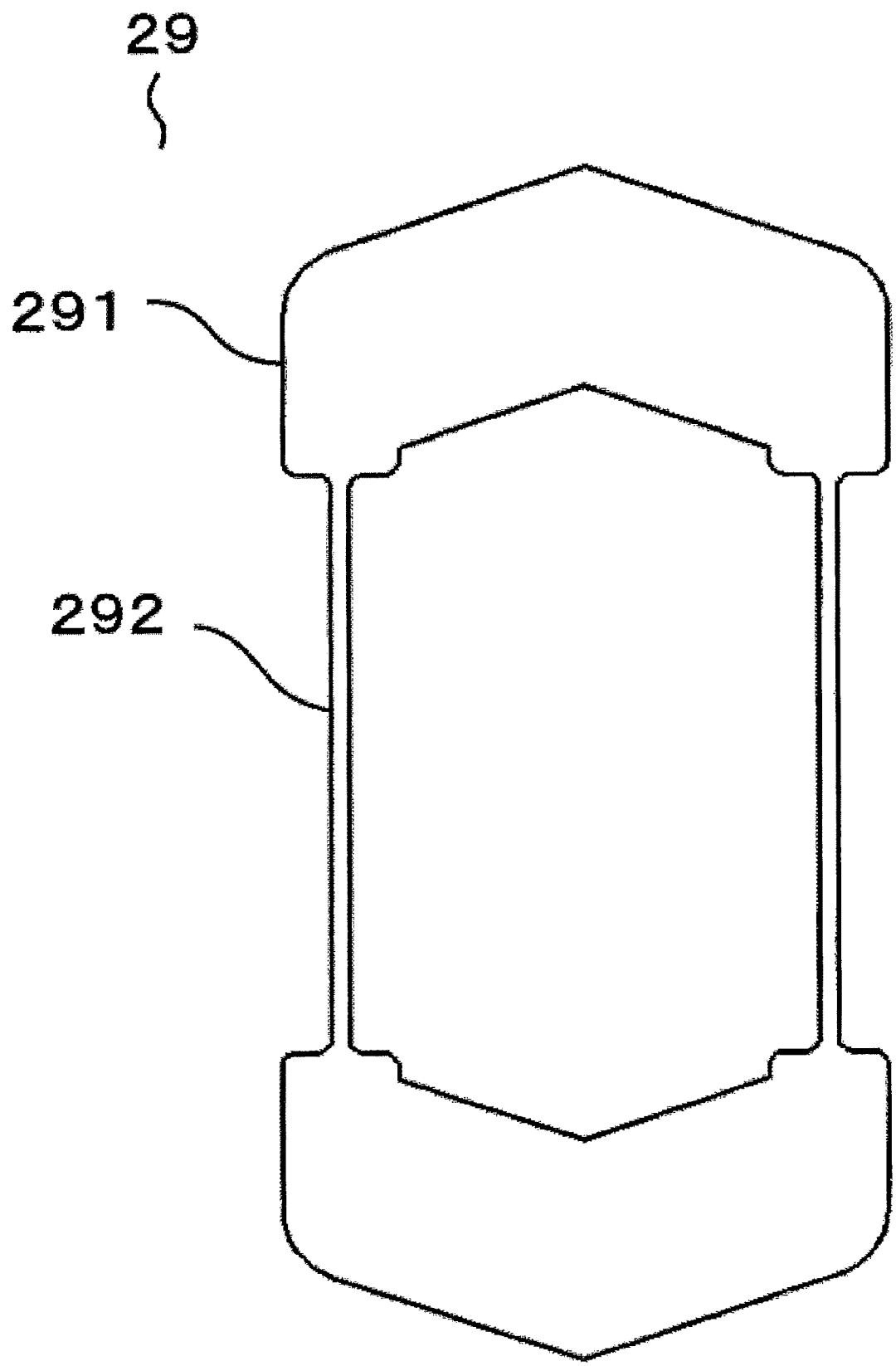
FIG. 27 is a plan view showing an insulator.
Figure 28:
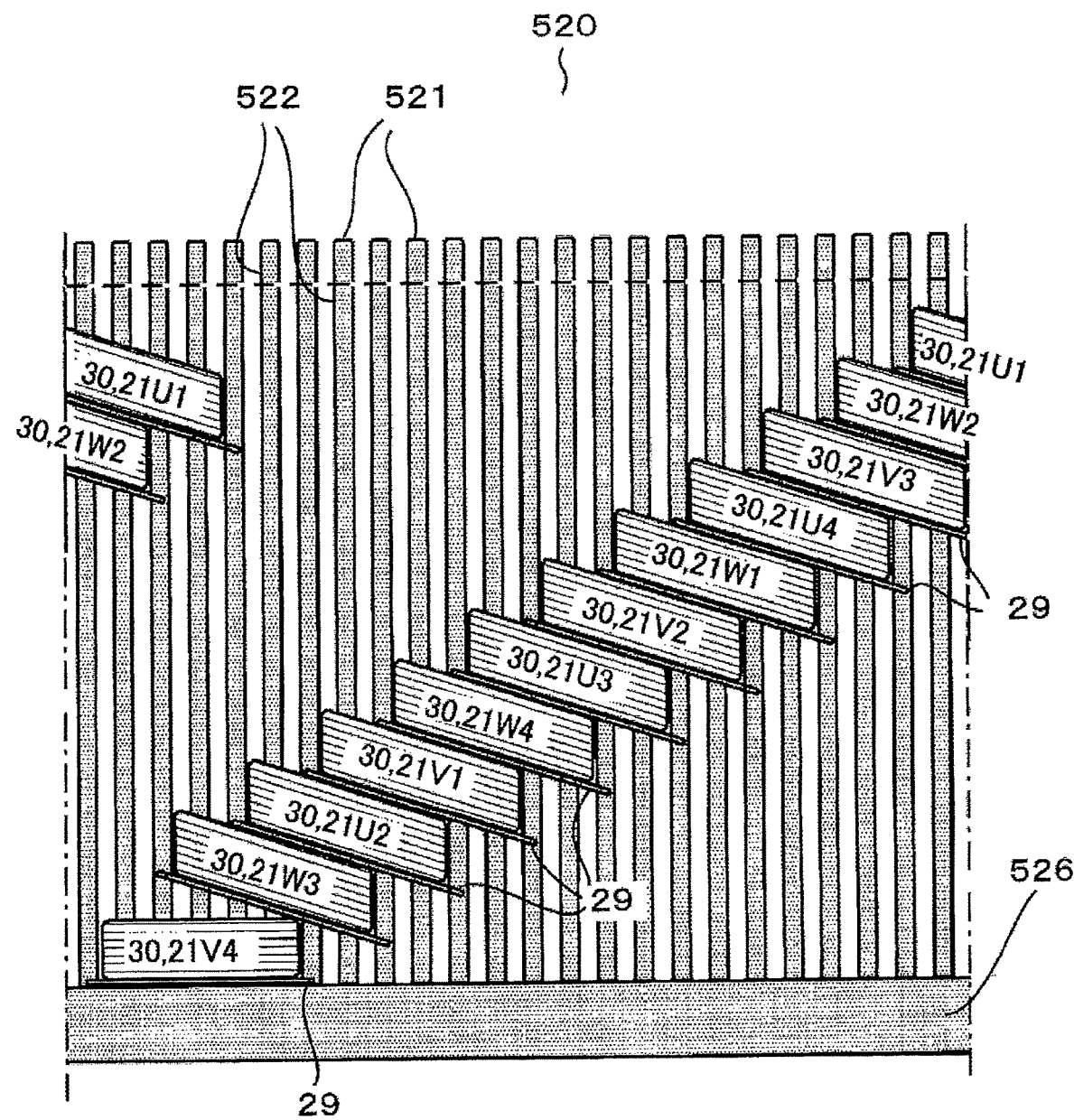
FIG. 28 is a development view of an annular conductor inserting device in which the insulators and annular conductors are arranged.
Figure 29:
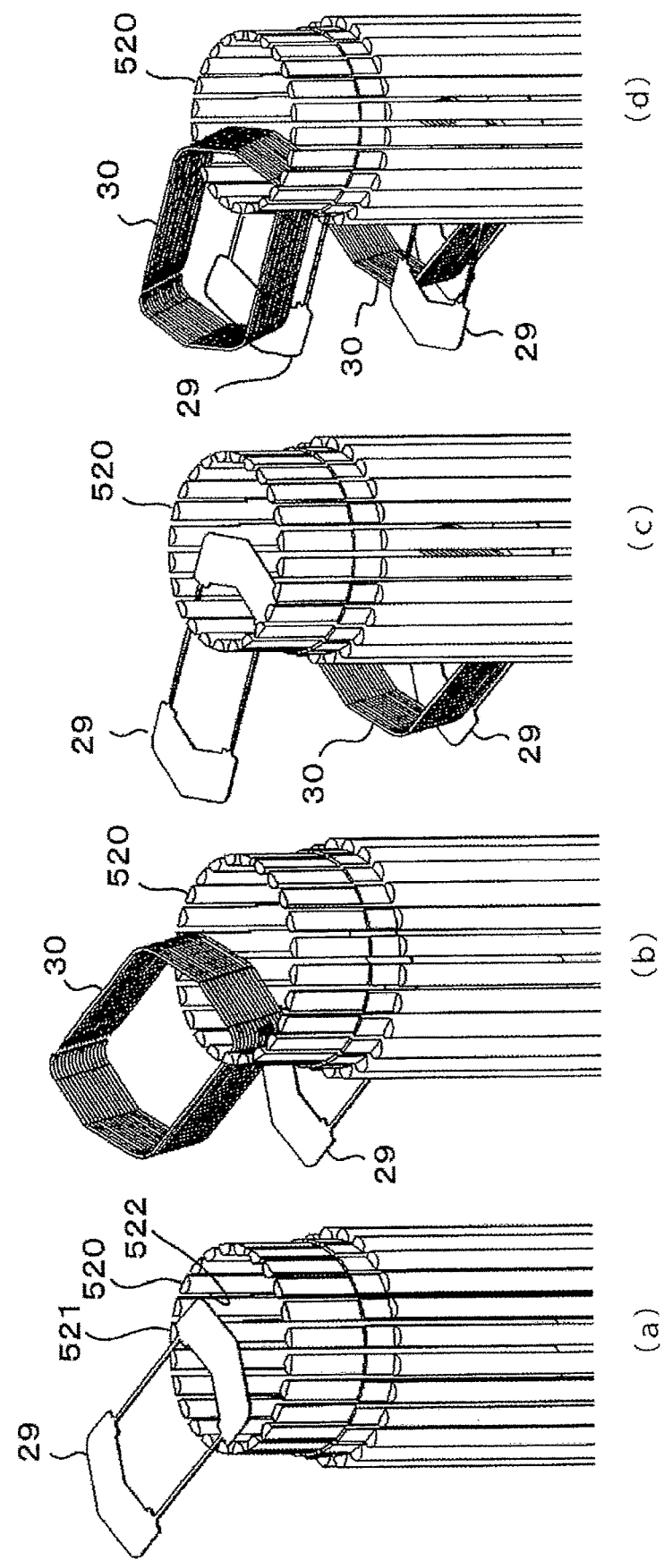
FIG. 29 illustrates a process for arranging the insulators and the annular conductors in an annular conductor inserting device.
Figure 30:
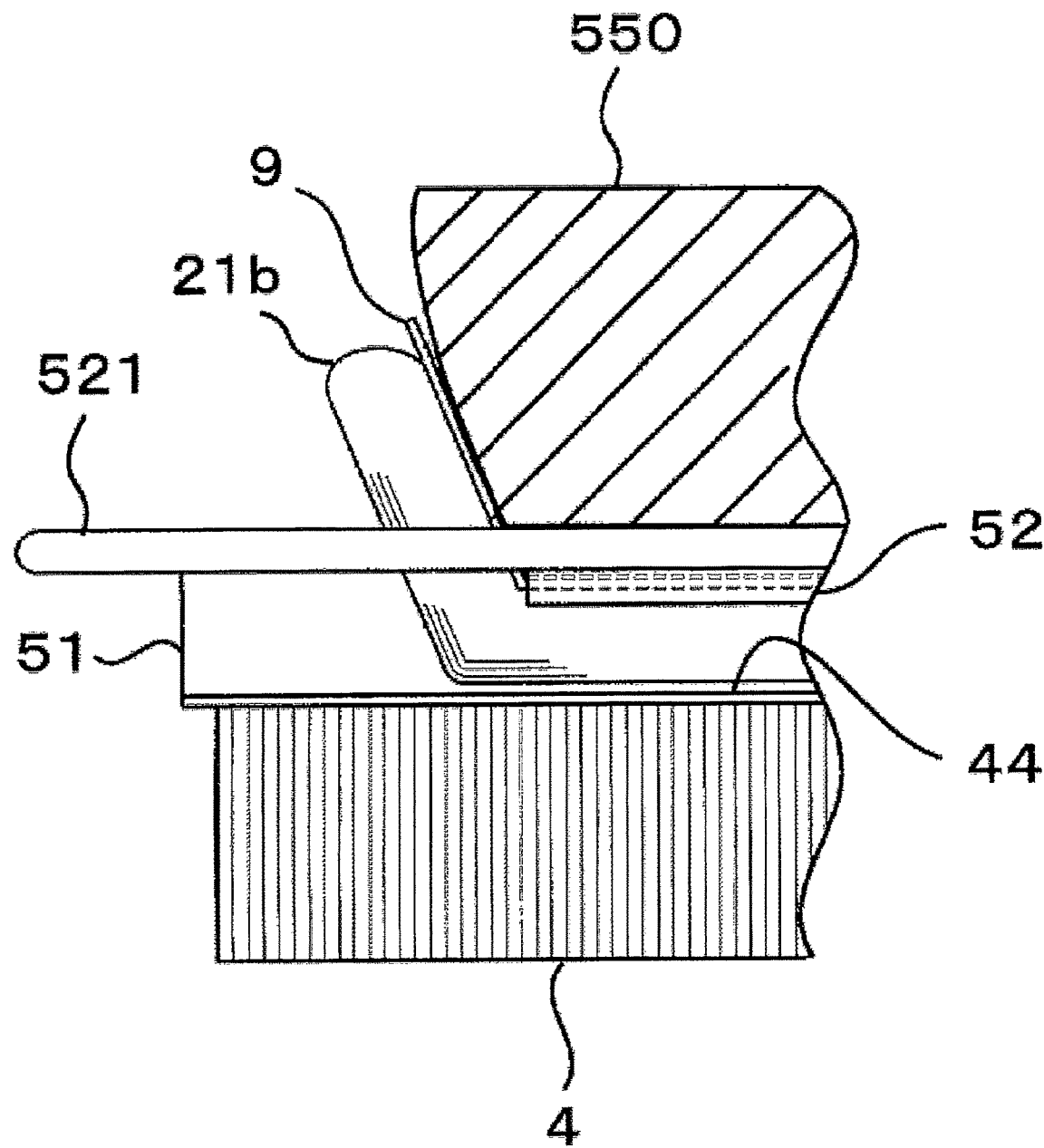
FIG. 30 illustrates a state when the insulator and the annular conductor are inserted into a slot.

FIG. 23 to FIG. 30 show embodiment 4. FIG. 23 is a sectional view of an armature. FIG. 24 is a detailed sectional view of a slot portion of the armature. FIG. 25 is a perspective view around a coil end of the armature. FIG. 26 is a flowchart illustrating a process for manufacturing the armature. FIG. 27 is a plan view showing an insulator. FIG. 28 is a development view of an annular conductor inserting device in which the insulators and annular conductors are arranged. FIG. 29 illustrates a process for arranging the insulator and the annular conductor in the annular conductor inserting device. FIG. 30 illustrates a state when the insulator and the annular conductor are inserted into a slot. In FIG. 23 to FIG. 25, an armature 410 includes insulating members 19. As shown in FIG. 25, each insulating member 19 has insulating portions 191 and linkage portions 192 which are integrated with each other. The insulating member 19 is formed by deformation of a plate-shaped insulator 29 shown in FIG. 27 when the insulator 29 is inserted together with the annular conductor 30 (FIG. 7) into the slots 44 (FIG. 23) of the core 4 by the annular conductor inserting device 500 (FIG. 8) (as described later in detail).

As shown in FIG. 27, first members 291 of the insulator 29 are provided with a predetermined interval therebetween in the up-down direction (corresponding to the axial direction of the armature) in FIG. 27, and are connected by two right and left second members 292. The right-left interval between the second members 292 is the same as the interval between the straight portions 30a (FIG. 7) of the annular conductor 30. A preferable material for the insulator 29 is a film formed of an insulating material, such as a polyethylene terephthalate film or a polyphenylene sulfide resin film.

When the insulator 29 as described above is inserted together with the annular conductor 30 into the slots 44, the insulator 29 is deformed to be the insulating member 19, so that the first members 291 become the insulating portions 191 which insulate the adjacent coil ends 21b for different phases from each other as shown in FIG. 25, and the second members 292 are located in the slots 44 and inward of the wedges 52 while being hardly deformed, and become the linkage portions 192 (see FIG. 24).

Next, a method for manufacturing the armature 410 will be described with reference to FIG. 26 to FIG. 30. As shown in FIG. 26, the process for manufacturing the armature 410 includes an insulator arrangement first step (step S21) and a spiral arrangement step (step S22) as insulator arrangement steps, in addition to the steps shown in FIG. 12. The spiral arrangement step (step S22) includes an insulator arrangement second step (step S221) as an insulator arrangement step and an overlap arrangement step (step S13). In the insulator arrangement first step (step S21), prior to the simple arrangement step (step S12), the insulator 29 is inserted and arranged into a pair of gaps 522 across a predetermined number of blades 521 so as to be located at the same position as the annular conductor 30 (21V4) to be arranged later (FIG. 29(a), FIG. 28). Next, in the simple arrangement step (step S12), the first annular conductor 30 is arranged in the retention guide portion 520 so as to overlap the previously arranged insulator 29 (FIG. 29(b), FIG. 28). When the insulator 29 is inserted into the gaps 522, the opposition interval between its second members 292 which are two sides opposite to each other is slightly narrowed (the curve of the first member 291 is slightly changed) by the blades 521 and thus the insulator 29 moves downward to be retained in an approximately horizontal state as shown in FIG. 28. When the annular conductor 30 (21V4) is inserted into the gaps 522, the opposition interval between its straight portion 30a which are two sides opposite to each other is slightly narrowed by the blades 521 and thus the annular conductor 30 (21V4) moves downward to be retained in an approximately horizontal state as shown in FIG. 28.

Further, in the insulator arrangement second step (step S221), the insulator 29 is inserted and arranged into a pair of gaps 522 across a predetermined number of blades 521 so as to be located at the same position as the annular conductor 30 (21W3) to be later arranged in the overlap arrangement step (step S13) (FIG. 29(c), FIG. 28). Subsequently, in the overlap arrangement step (step S13), the annular conductor 30 (21W3) is arranged so that the annular conductor 30 (21W3) overlaps the insulator 29 previously arranged in the insulator arrangement second step (step S2211) (FIG. 29(d), FIG. 28). Hereinafter, the insulator arrangement second step (step S221) and the overlap arrangement step (step S13) are repeated so that all the other annular conductors 30 are arranged in the retention guide portion 520 of the annular conductor inserting device 500 as shown in FIG. 28. That is, the annular conductors 30 (21W3 to 21U1) arranged in the spiral arrangement step (step S22) are arranged in a spiral shape in the retention guide portion 520 as shown in FIG. 28. In addition, the insulators 29 are arranged directly under the respective annular conductors 30. Thus, by combination of the insulator arrangement first step (step S21), the simple arrangement step (step S11), the insulator arrangement second step (step S221), and the overlap arrangement step (step S12), all the annular conductors 30 for forming a predetermined number of coils 21 needed for the armature 410 are arranged in the retention guide portion 620. Regarding the annular conductors 30 (21W3) to 30 (21U1) which are arranged in the overlap arrangement step, as in embodiment 1, when each annular conductor 30 is inserted into the gaps 522, the opposition interval between its straight portions 30a which are two sides opposite to each other is slightly expanded by the blades 521 and thus the annular conductor 30 moves downward.

Hereinafter, as in the process shown in FIG. 12, the retention guide portion 520 is fitted to the core 4 in the fitting step (step S14), and the annular conductors 30 and the insulators 29 are inserted into the slots 44 of the core 4 by the pusher 550 in the insertion step (step S15). At this time, as shown in FIG. 30, also the insulators 29 are pushed together with the annular conductors 30 by the pusher 550 (FIG. 10) so that they are mounted to the core 4 and thus become the coils 21 and the insulating members 19. Each first member 291 is bent into an arc shape to become the insulating portion 191, and each second member 292 is located in the slot 44 and inward of the wedge 52 while being hardly deformed, and becomes the linkage portion 192. Thus, each insulating portion 191 covers one side of the coil end 21b, i.e., one side (inner side) in the radial direction of the inner circumferential part 43 of the core 4, whereby insulation from the coil end 21b of the coil 21 that is adjacent thereto (on the inner side) is ensured.

Embodiment 5

Figure 31:
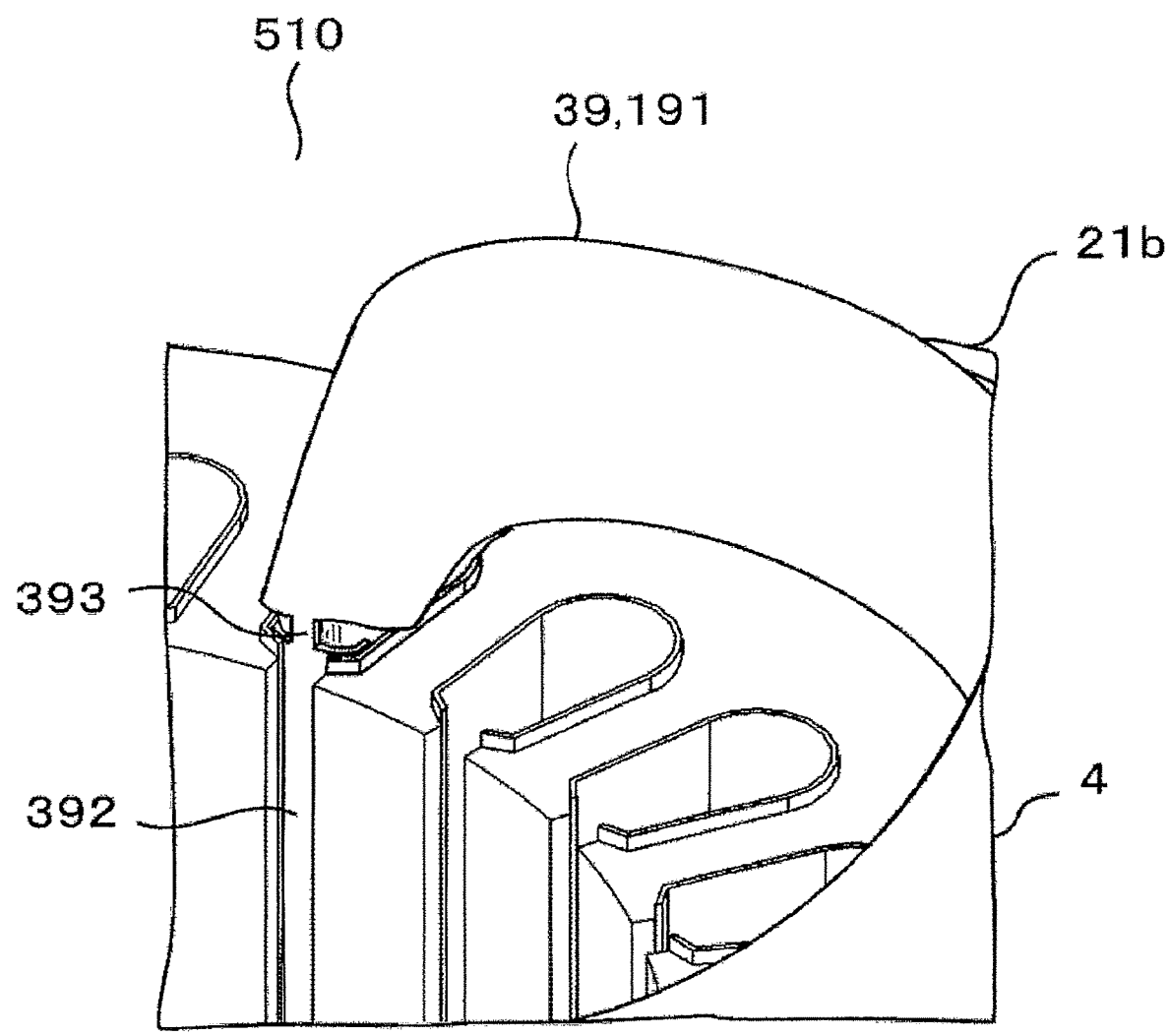
FIG. 31 is a perspective view around a coil end of an armature according to embodiment 5.
Figure 32:
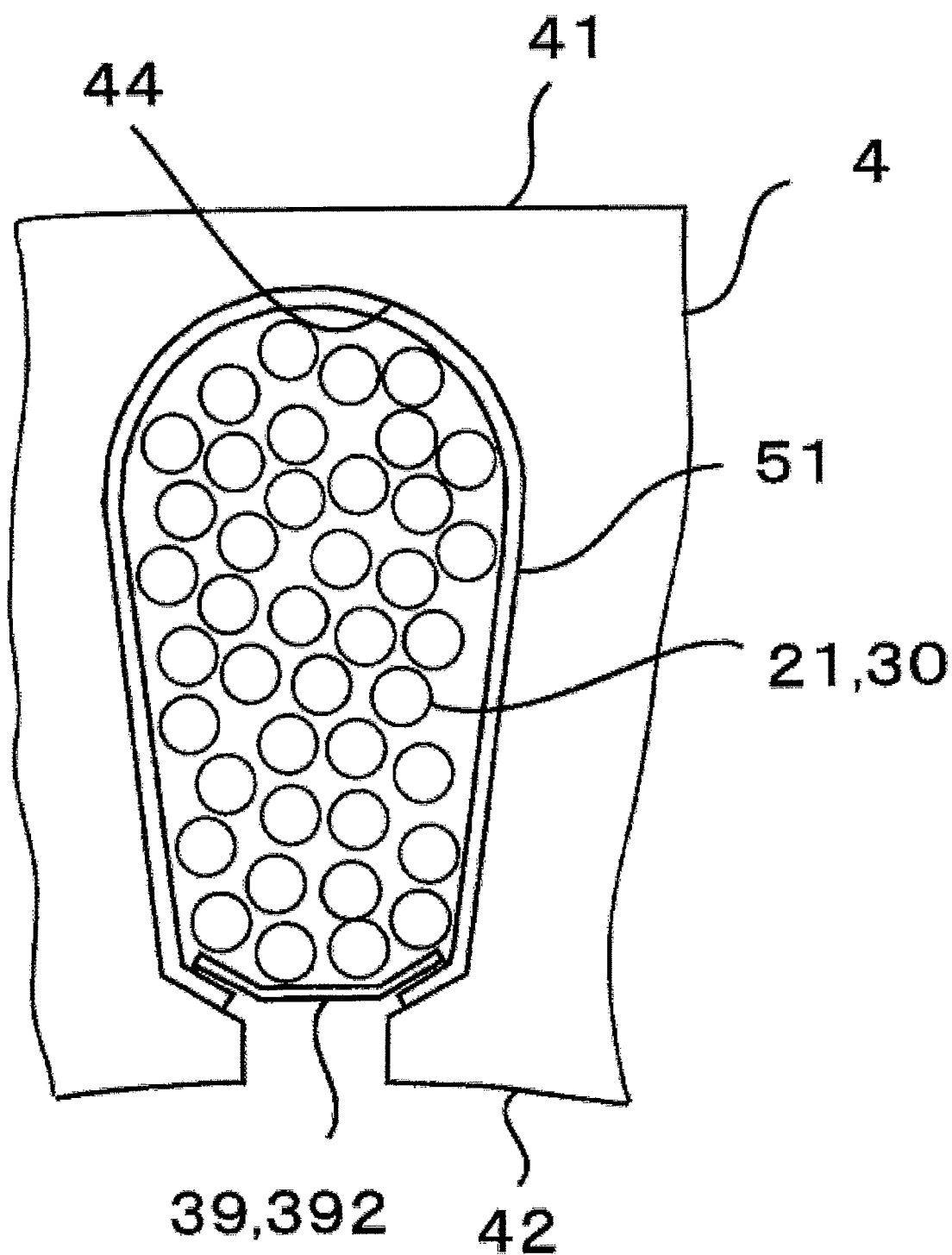
FIG. 32 is a detailed sectional view of a slot portion of the armature in FIG. 31.
Figure 33:
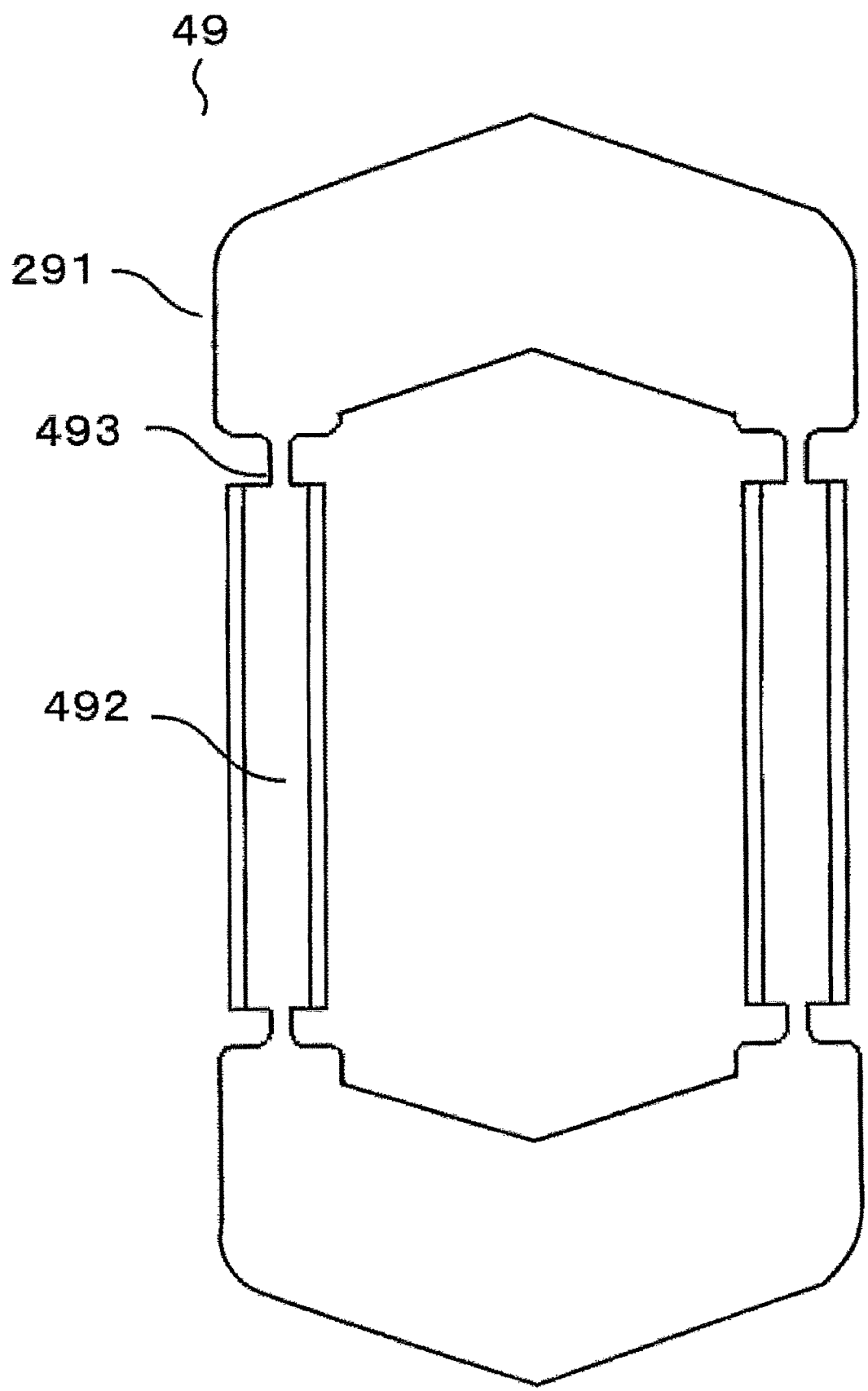
FIG. 33 is a plan view showing an insulator.
Figure 34:
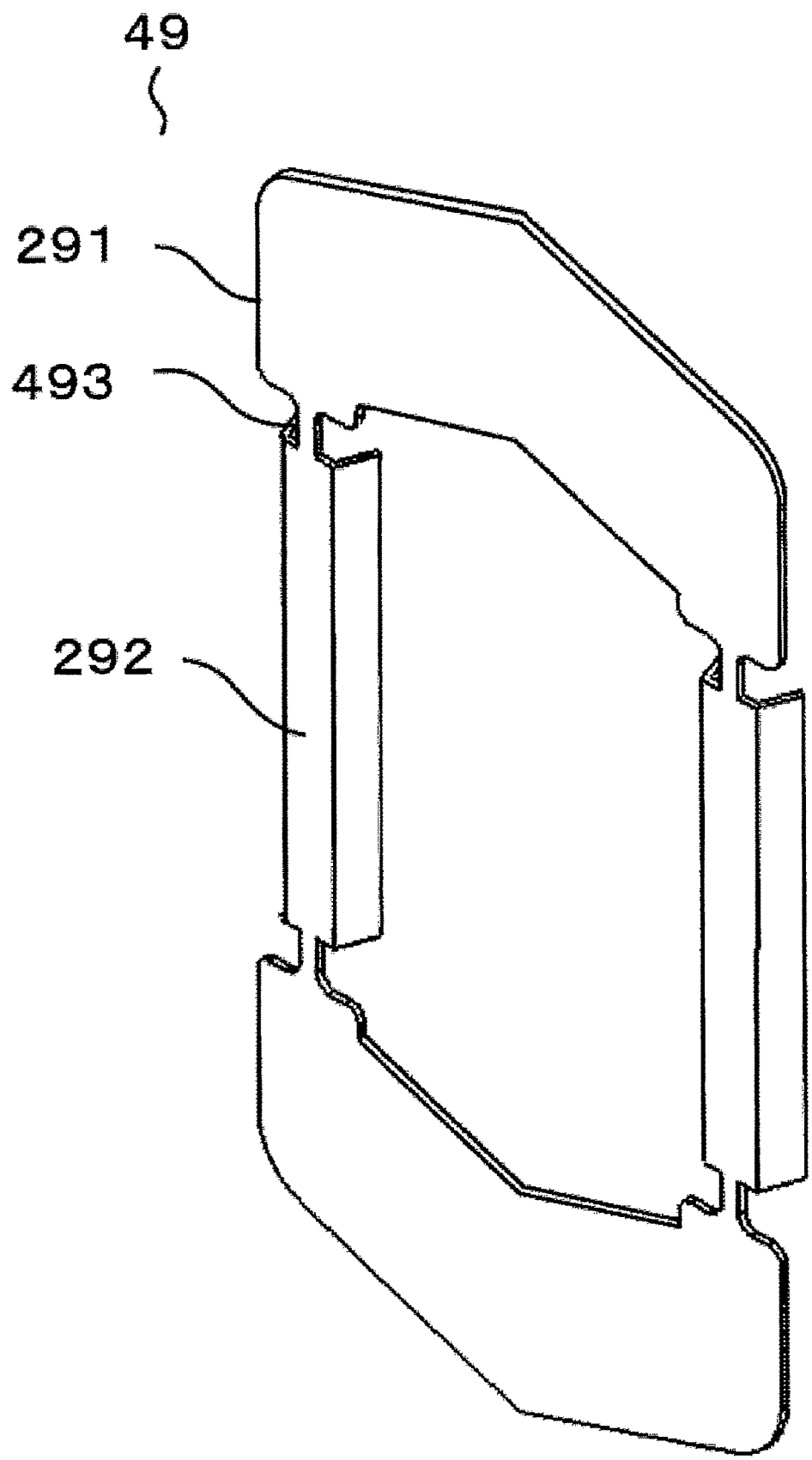
FIG. 34 is a perspective view showing the insulator.

FIG. 31 to FIG. 34 show embodiment 5. FIG. 31 is a perspective view around a coil end of an armature. FIG. 32 is a detailed sectional view showing a slot portion. FIG. 33 is a plan view showing an insulator. FIG. 34 is a perspective view showing the insulator. In FIG. 31, an armature 510 includes insulating members 39. As shown in FIG. 31 and FIG. 32, each insulating member 39 has insulating portions 191, wedge portions 392, and narrow width portions 393. The insulating portions 191 and the wedge portions 392 are integrated with each other, and the narrow width portions 393 are provided at both ends, in the up-down direction in the drawing, of each wedge portion 392. Each insulating portion 191 is the same as that shown in FIG. 25, and covers one side of the coil end 21b, i.e., one side in the radial direction of the inner circumferential part 43 of the core 4. Each wedge portion 392 has the same function as the wedge 52 in FIG. 6, and prevents the coil 21 from protruding out, but also serves as a linkage portion connecting the insulating portions 191.

An insulator 49 having first members 491 and second members 492 as shown in FIG. 33 and FIG. 34 is mounted to the slots 44 of the core 4 in the same manner as the insulator 29 in FIG. 27, whereby the insulating member 39 having the insulating portions 391 and the wedge portions 392 is formed. At this time, the first members 491 become the insulating portions 391, and the second members 492 become the wedge portions 392. In this case, if the width (dimension in the circumferential direction of the inner circumferential part 43 of the core 4) of the second member 492 is great, the insulator 49 interferes with the blades 521 when being inserted into the gap between the blades 521 of the retention guide portion 520. Therefore, a cutout 493 is formed by cutting a part, of each second member 492, that is close to the first member 491. When the insulator 49 is mounted to the slots 44 of the core 4 and becomes the insulating member 39, the cutouts 493 become the narrow width portions 393.

Since the wedge portions 392 serve also as the linkage portions as described above, the number of components and the number of working steps can be decreased and reduction of the slot space factor (a ratio of the conductor area of the coil 21 (see FIG. 6) with respect to the effective part area of the slot 44) can be prevented.

Embodiment 6

Figure 35:
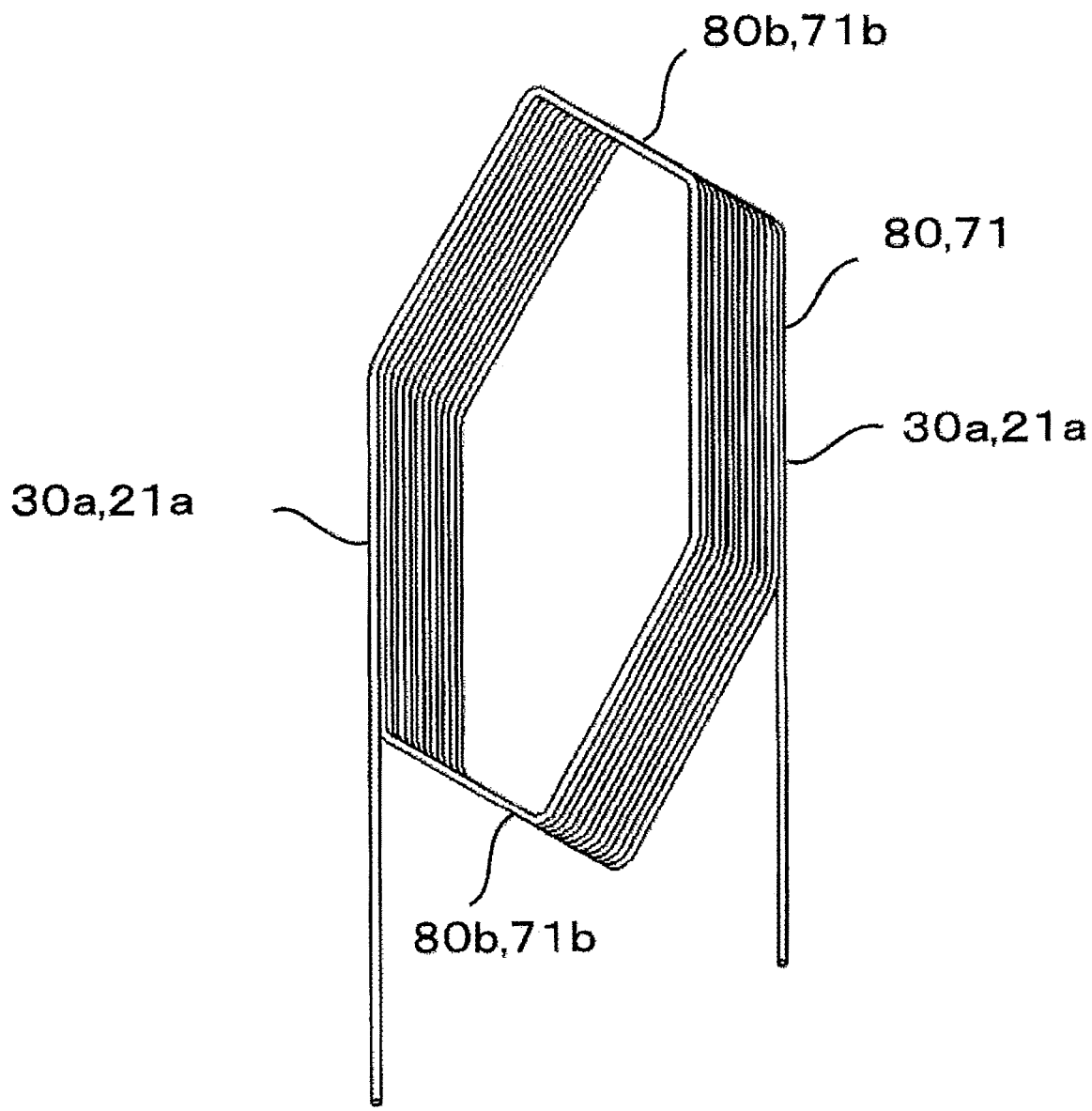
FIG. 35 is a perspective view showing the correspondence relationship between an annular conductor and a coil obtained by the annular conductor being inserted into a slot, according to embodiment 6.
Figure 36:
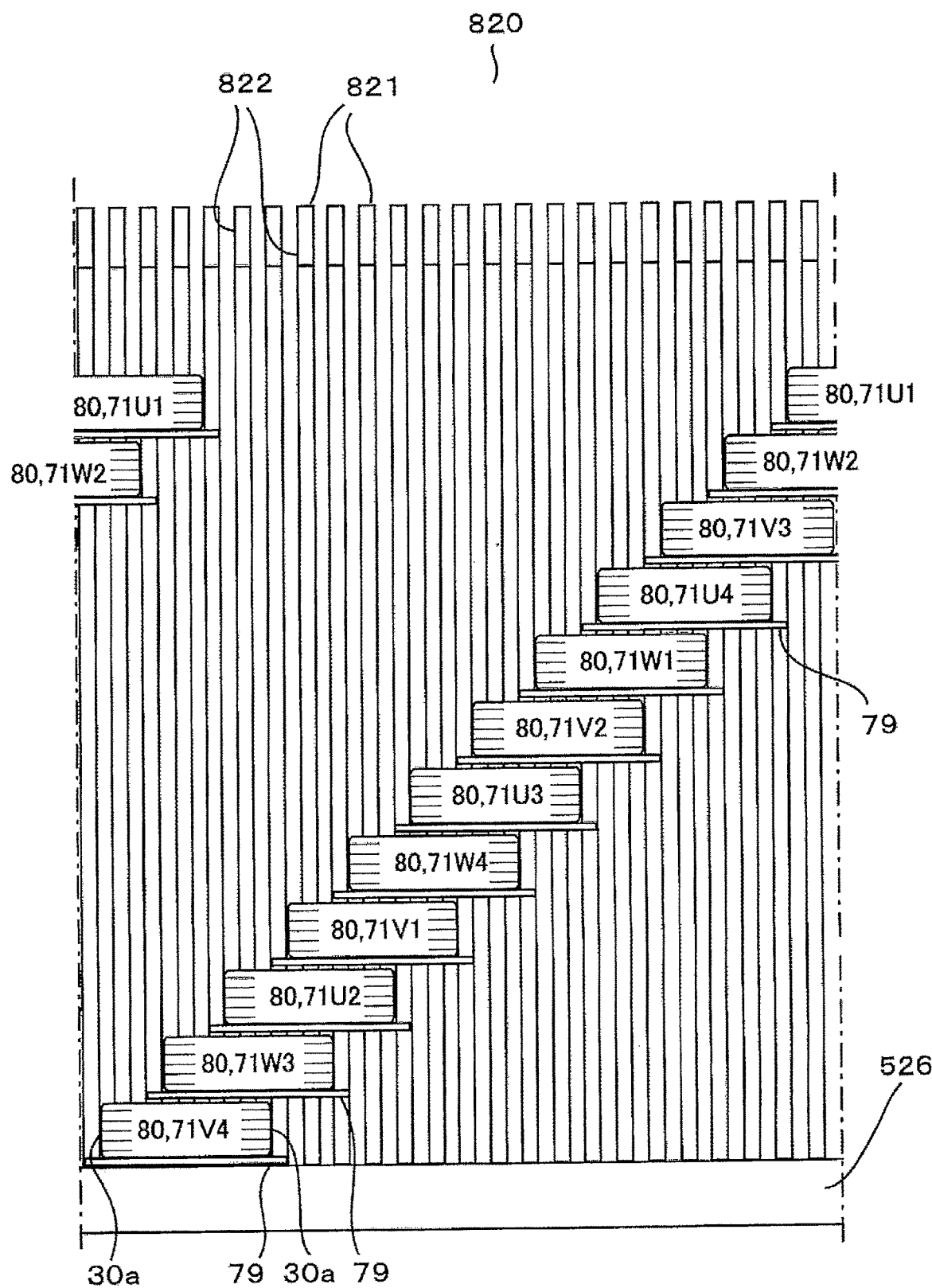
FIG. 36 is a development view of an annular conductor inserting device in which the insulators and the annular conductors are arranged.

FIG. 35 and FIG. 36 show embodiment 6. FIG. 35 is a perspective view showing the correspondence relationship between an annular conductor and a coil obtained by the annular conductor being inserted into slots. FIG. 36 is a development view of an annular conductor inserting device in which insulators and the annular conductors are arranged. In FIG. 35, an annular conductor 80 has straight portions 30a which are two sides opposite to each other in the right-left direction in FIG. 35, and connection portions 80b connecting the straight portions 30a which are two sides opposite to each other. The annular conductor 80 is inserted into the slots 44 (see FIG. 4) of the core 4 by an annular conductor inserting device not shown, and thus becomes the coil 71. The correspondence relationship between the annular conductor 80 and the coil 71 is shown side by side in FIG. 35. That is, the straight portions 30a are the same as those in FIG. 7, and become the slot accommodation portions 21a when inserted into the slots 44 (FIG. 4), and the connection portions 80b become coil ends 71b connecting the slot accommodation portions 21a. In FIG. 36, the depths (insertion dimensions) of insertions of the right and left straight portion 30a of the annular conductor 80 are equal to each other, and the annular conductors 80 (71V4) to 80 (71U1) are arranged in a stair shape and in a spiral shape in an approximately horizontal state in FIG. 36, i.e., perpendicularly to blades 821 described later (see FIG. 36). In addition, insulators 79 are respectively arranged under the annular conductors 80 (71V4) to 80 (71U1) in FIG. 36. It is noted that the insulators 79 are the same as the insulators 29 in FIG. 27, but the dimension thereof in the right-left direction in FIG. 27 is slightly narrowed in accordance with the opposition interval between the straight portions 30a (FIG. 35) which are two sides opposite to each other, of the annular conductor 80.

In FIG. 36, the retention guide portion 820 is the same as the retention guide portion 520 except that the lengths of the blades 821 and gaps 822 are longer than the lengths of the blades 521 and the gaps 522 of the retention guide portion 520 shown in FIG. 9. Further, the annular conductor inserting device in the present embodiment is the same as the annular conductor inserting device 500 shown in FIG. 8 except for the difference in the retention guide portion 820. The insulators 79 and the annular conductors 80 are inserted and retained in the retention guide portion 820 through the same procedure (see steps S11 to S22 in FIG. 26) as described in embodiment 4. It is noted that, also in FIG. 36, each annular conductor 80 and the insulator 79 inserted next thereto are shown with a gap therebetween in the insertion direction, but actually, they are in contact with each other. The subsequent fitting step (step S14) and insertion step (step S15) are also the same as those in FIG. 26. According to the present embodiment, the lengths of the connection portions 80b of the annular conductors 80, i.e., the lengths of the coil ends 71b of the coils 71 can be shortened.

As shown in FIG. 2, FIG. 17, and FIG. 20, in the armature manufactured in each embodiment described above, as seen from the axial direction of the cylindrical inner circumferential part 43 of the core 4, coil ends located on circles concentric with the inner circumferential part 43 are: in FIG. 2, coil ends of the coil 21V4 located on the innermost circumferential side and the coil 21U1 located on the outermost circumferential side; in FIG. 17, coil ends of the coil 21V4 and the coil 21V2 located on the innermost circumferential side and the coil 21U1 and the coil 21U3 located on the outermost circumferential side; and in FIG. 20, coil ends of the coil 21V2 located on the innermost circumferential side, the coil 21V4 and the coil 21U3 located in the middle, and the coil 21U1 located on the outermost circumferential side. The coil ends other than the above coils are located on volute lines concentric with the inner circumferential part 43.

The annular conductors 30 in the above embodiments 1 to 5 are each formed by winding a thin conductive wire and thus have a comparatively low stiffness, and therefore the opposition interval between the straight portions 30a which are two sides opposite to each other can be changed by the blades when each annular conductor 30 is arranged in the retention guide portion. However, in the case of using annular conductors having a high stiffness, the dimension relationship between the gaps 522 (FIG. 14) of the blades 521 and the annular conductors 30 (21V4) to 30 (21U1) may be set such that the annular conductor to be arranged in the simple arrangement step, e.g., the annular conductor 30 (21V4) in FIG. 14, is also inserted being inclined rightward with the right straight portion 30a (see FIG. 7) inserted more deeply than the left straight portion 30a, the other eleven annular conductors 30 (21W3) to 30 (21U1) are also arranged being inclined in the same manner as the annular conductor 30 (21V4), and the annular conductors 30 are arranged in a spiral shape as a whole. In this case, it is not necessary to apply a great force for deforming the annular conductors 30 (21V4) to 30 (21U1) when they are inserted into the gaps 522, and therefore the insertion can be easily performed.

It is noted that, within the scope of the present invention, the above embodiments may be freely combined with each other, or each of the above embodiments may be modified or simplified as appropriate.

The invention claimed is:

1. A method for manufacturing an armature including a core having a plurality of slots provided at a cylindrical inner circumferential part, and coils inserted into the slots, the method being performed by using an annular conductor inserting device, the annular conductor inserting device including:

a retention guide portion having support members and a fixation member, the support members being arranged in a cylindrical shape with gaps therebetween in a circumferential direction and one end of each support member being fixed to the fixation member, thus forming a cylindrical part, the cylindrical part configured to be fitted to the inner circumferential part of the core and configured such that positions in the circumferential direction of the gaps coincide with positions of the slots of the core; and an engagement portion configured to be movable, inside the cylindrical part, in an axial direction of the cylindrical part, the method comprising:

an arrangement step of arranging a necessary number of annular conductors each formed by winding a conductive wire in an annular shape, in the retention guide portion, by combination of: a simple arrangement step of inserting, across a plurality of the support members, a plurality of the annular conductors into the gaps in which the annular conductors have not been inserted yet, thereby arranging the plurality of annular conductors in the retention guide portion; and an overlap arrangement step of inserting another of the annular conductors into others of the gaps across a plurality of the support members so as to partially overlap the previously inserted annular conductor in the axial direction, thereby arranging the other annular conductor in the retention guide portion;

a fitting step of fitting the retention guide portion and the inner circumferential part of the core to each other and causing the positions in the circumferential direction of the gaps to coincide with the positions of the slots; and an insertion step of moving the engagement portion in the axial direction of the retention guide portion and engaging the engagement portion with the annular conductors arranged in the retention guide portion, to insert the annular conductors into the slots, thereby forming the coils, wherein the arrangement step includes:
a first-round arrangement step of arranging the annular conductors in the retention guide portion over an entire circumference of the retention guide portion by combination of the simple arrangement step and the overlap arrangement step; and
a second-round arrangement step of, after the annular conductors are arranged in the first-round arrangement step, further arranging the annular conductors in the retention guide portion over the entire circumference of the retention guide portion by combination of the simple arrangement step and the overlap arrangement step, such that, in the simple arrangement step in the second-round arrangement step, another of the annular conductors is inserted into others of the gaps, at a position shifted in the circumferential direction of the retention guide portion so as not to overlap, in the axial direction of the retention guide portion, the annular conductor arranged in the simple arrangement step in the first-round arrangement step, whereby the other annular conductor is arranged in the retention guide portion.

2. The method for manufacturing the armature according to claim 1, wherein
in the simple arrangement step, the plurality of annular conductors are inserted into the gaps and arranged in the retention guide portion such that the plurality of annular conductors are dispersed in the circumferential direction of the retention guide portion so as not to overlap each other in the axial direction.

3. The method for manufacturing the armature according to claim 2, wherein
each coil has slot accommodation portions accommodated in the corresponding slots, and coil ends connecting the slot accommodation portions,
the method comprising, prior to the simple arrangement step and the overlap arrangement step, an insulator arrangement step of inserting an insulator into the gaps across a plurality of the support members so as to be located at the same position as each annular conductor to be arranged later, thereby arranging the insulator in the retention guide portion, the insulator having first members with a predetermined gap therebetween, and second members connecting the first members, and
in the insertion step, the engagement portion is moved in the axial direction of the retention guide portion and engaged with the insulators and the annular conductors arranged in the retention guide portion, to insert the insulators and the annular conductors into the slots, so that each insulator becomes an insulating member having: insulating portions each covering one side, of the corresponding coil end, in a radial direction of the inner circumferential part of the core; and linkage portions located inside the slots and connecting the insulating portions, while the first members become the insulating portions and the second members become the linkage portions, and the annular conductors become the coils having the slot accommodation portions and the coil ends.

4. The method for manufacturing the armature according to claim 3, wherein
the linkage portions of the insulating members are located inside the slots and serve also as wedge portions preventing the coils from protruding out of the slots.

5. The method for manufacturing the armature according to claim 4, wherein
the second members of the insulators have narrow width portions,
the narrow width portions have such dimensions that allow the narrow width portions to be inserted into the gaps of the support members, and
when the insulators are arranged in the support members, the narrow width portions are inserted into the gaps of the support members and thus arranged in the retention guide portion.

6. The method for manufacturing the armature according to claim 1, wherein
each coil has slot accommodation portions accommodated in the corresponding slots, and coil ends connecting the slot accommodation portions,
the method comprising, prior to the simple arrangement step and the overlap arrangement step, an insulator arrangement step of inserting an insulator into the gaps across a plurality of the support members so as to be located at the same position as each annular conductor to be arranged later, thereby arranging the insulator in the retention guide portion, the insulator having first members with a predetermined gap therebetween, and second members connecting the first members, and
in the insertion step, the engagement portion is moved in the axial direction of the retention guide portion and engaged with the insulators and the annular conductors arranged in the retention guide portion, to insert the insulators and the annular conductors into the slots, so that each insulator becomes an insulating member having: insulating portions each covering one side, of the corresponding coil end, in a radial direction of the inner circumferential part of the core; and linkage portions located inside the slots and connecting the insulating portions, while the first members become the insulating portions and the second members become the linkage portions, and the annular conductors become the coils having the slot accommodation portions and the coil ends.

7. The method for manufacturing the armature according to claim 6, wherein
the linkage portions of the insulating members are located inside the slots and serve also as wedge portions preventing the coils from protruding out of the slots.

8. The method for manufacturing the armature according to claim 7, wherein
the second members of the insulators have narrow width portions,
the narrow width portions have such dimensions that allow the narrow width portions to be inserted into the gaps of the support members, and
when the insulators are arranged in the support members, the narrow width portions are inserted into the gaps of the support members and thus arranged in the retention guide portion.

9. A method for manufacturing an armature including a core having a plurality of slots provided at a cylindrical inner circumferential part, and coils inserted into the slots, the method being performed by using an annular conductor inserting device, the annular conductor inserting device including:
a retention guide portion having support members and a fixation member, the support members being arranged in a cylindrical shape with gaps therebetween in a circumferential direction and one end of each support member being fixed to the fixation member, thus forming a cylindrical part, the cylindrical part configured to be fitted to the inner circumferential part of the core and configured such that positions in the circumferential direction of the gaps coincide with positions of the slots of the core; and an engagement portion configured to be movable, inside the cylindrical part, in an axial direction of the cylindrical part, the method comprising:

an arrangement step of arranging a necessary number of annular conductors each formed by winding a conductive wire in an annular shape, in the retention guide portion, by combination of: a simple arrangement step of inserting, across a plurality of the support members, a plurality of the annular conductors into the gaps in which the annular conductors have not been inserted yet, thereby arranging the plurality of annular conductors in the retention guide portion; and an overlap arrangement step of inserting another of the annular conductors into others of the gaps across a plurality of the support members so as to partially overlap the previously inserted annular conductor in the axial direction, thereby arranging the other annular conductor in the retention guide portion;

a fitting step of fitting the retention guide portion and the inner circumferential part of the core to each other and causing the positions in the circumferential direction of the gaps to coincide with the positions of the slots; and an insertion step of moving the engagement portion in the axial direction of the retention guide portion and engaging the engagement portion with the annular conductors arranged in the retention guide portion, to insert the annular conductors into the slots, thereby forming the coils, wherein each coil has slot accommodation portions accommodated in the corresponding slots, and coil ends connecting the slot accommodation portions, the method comprising, prior to the simple arrangement step and the overlap arrangement step, an insulator arrangement step of inserting an insulator into the gaps across a plurality of the support members so as to be located at the same position as each annular conductor to be arranged later, thereby arranging the insulator in the retention guide portion, the insulator having first members with a predetermined gap therebetween, and second members connecting the first members, and in the insertion step, the engagement portion is moved in the axial direction of the retention guide portion and engaged with the insulators and the annular conductors arranged in the retention guide portion, to insert the insulators and the annular conductors into the slots, so that each insulator becomes an insulating member having: insulating portions each covering one side, of the corresponding coil end, in a radial direction of the inner circumferential part of the core; and linkage portions located inside the slots and connecting the insulating portions, while the first members become the insulating portions and the second members become the linkage portions, and the annular conductors become the coils having the slot accommodation portions and the coil ends.

* * * * *